United States Patent [19]
Iwata et al.

[11] Patent Number: 4,952,955
[45] Date of Patent: Aug. 28, 1990

[54] FOCAL LENGTH SWITCH-OVER CAMERA

[75] Inventors: Michihiro Iwata, Sakai; Haruo Kobayashi, Osaka; Osamu Hatamori, Sakai, all of Japan

[73] Assignee: Minolta Camera Kabushiki Kaisha, Osaka, Japan

[21] Appl. No.: 318,449

[22] Filed: Mar. 2, 1989

Related U.S. Application Data

[63] Continuation of Ser. No. 137,092, Dec. 23, 1987, abandoned.

[30] Foreign Application Priority Data

| Dec. 24, 1986 | [JP] | Japan | 61-310594 |
| Dec. 25, 1986 | [JP] | Japan | 61-309712 |
| Dec. 26, 1986 | [JP] | Japan | 61-309365 |
| Dec. 26, 1986 | [JP] | Japan | 61-309367 |

[51] Int. Cl.$^5$ .............................. G03B 3/00
[52] U.S. Cl. .................. 354/195.1; 354/195.12
[58] Field of Search ................ 354/195.1, 195.12

[56] References Cited

U.S. PATENT DOCUMENTS

| 2,693,736 | 11/1954 | Schumacher . | |
| 3,882,520 | 5/1975 | Kamp et al. | 354/195.12 |
| 3,893,135 | 7/1975 | Matsui et al. | 354/195.12 X |
| 4,204,760 | 5/1980 | Kobayashi | 354/195.12 |
| 4,214,829 | 7/1980 | Ohashi | 354/195.12 |
| 4,576,460 | 3/1986 | Daitoku et al. | 354/195.1 |
| 4,669,848 | 6/1987 | Wakabayashi | 354/195.12 |

FOREIGN PATENT DOCUMENTS

| 0102549 | 3/1984 | European Pat. Off. . |
| 59-170826 | 11/1984 | Japan . |
| 60-80812 | 5/1985 | Japan . |
| 60-100126 | 6/1985 | Japan . |
| 60-122931 | 7/1985 | Japan . |
| 61-35435 | 2/1986 | Japan . |
| 61-236536 | 6/1986 | Japan . |
| 61-217001 | 9/1986 | Japan . |
| 61-217026 | 9/1986 | Japan . |
| 61-170022 | 10/1986 | Japan . |

Primary Examiner—A. A. Mathews
Attorney, Agent, or Firm—Burns, Doane, Swecker & Mathis

[57] ABSTRACT

A camera having a photographic optical system capable of switching over a focal length having a control member, a cam operatively connected with the control member, a first cam face defined on the cam for effecting a focus adjustment in a first focal length, a second cam face defined on the cam for switching over from the first focal length to a second focal length, a third cam face defined on the cam for effecting a focus adjustment in the second focal length and a cam follower driven by the first through third cam faces and connected with the photographic optical system to drive the same. The second cam face is aligned in an operative direction of the cam or peripherally relative to the first cam face and the third cam face is aligned in the operative direction of the cam or peripherally relative to the second cam face. Thereby, since the respective cam faces for switching over a focal length and for effecting a focus adjustment in the two focal lengths may be formed having different angles relative to the operative or rotational direction of the cam, a movement amount of the cam follower of the photographic optical system relative to an operative amount of the cam may be conveniently set.

17 Claims, 22 Drawing Sheets

FIG. 1
FIG. 30
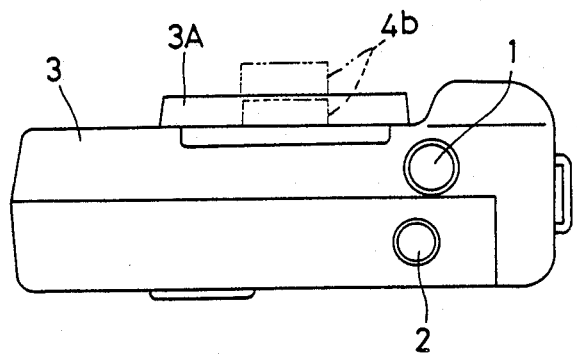
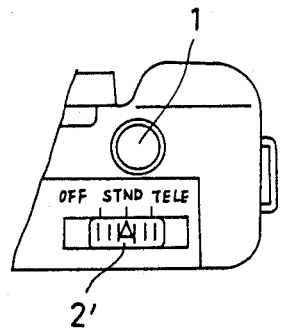
FIG. 3A
FIG. 3B
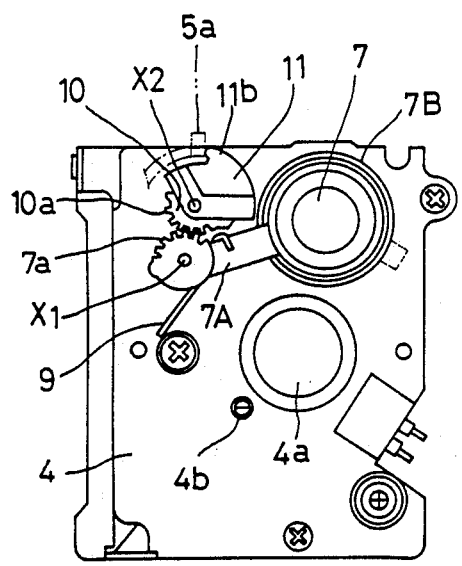
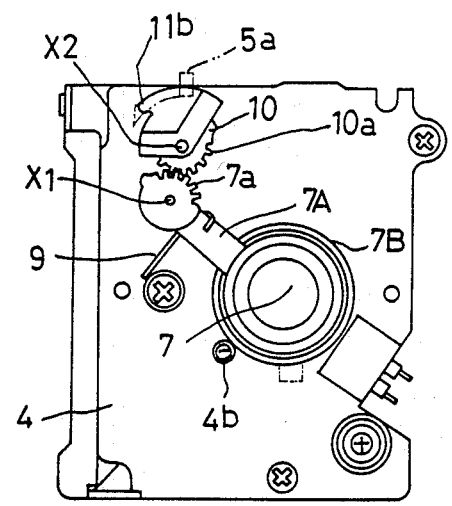

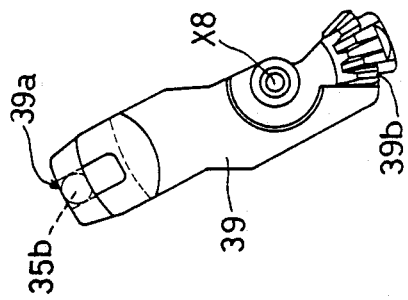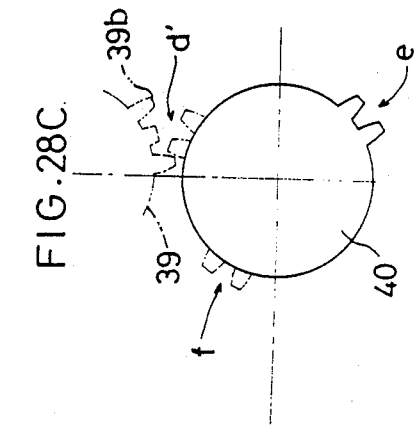
FIG. 27A  FIG. 27B  FIG. 27C
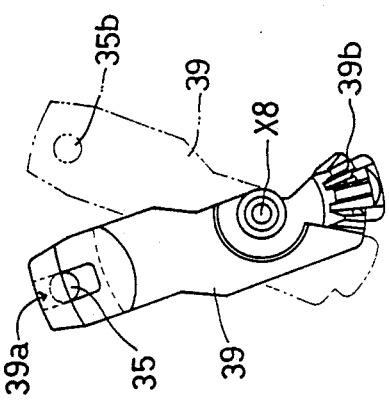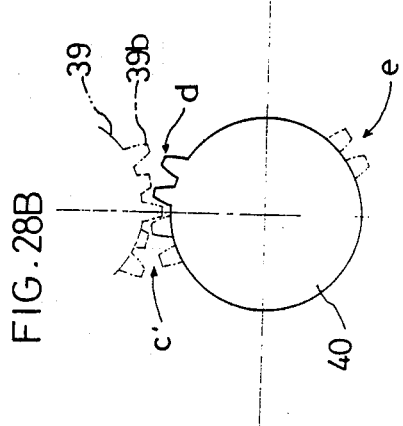
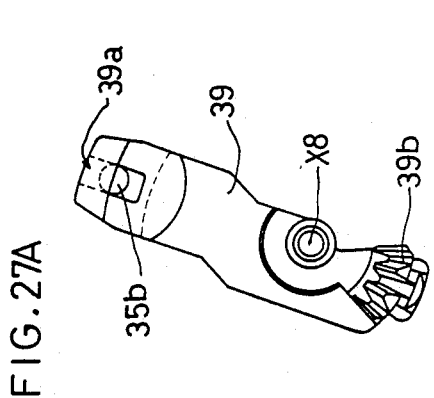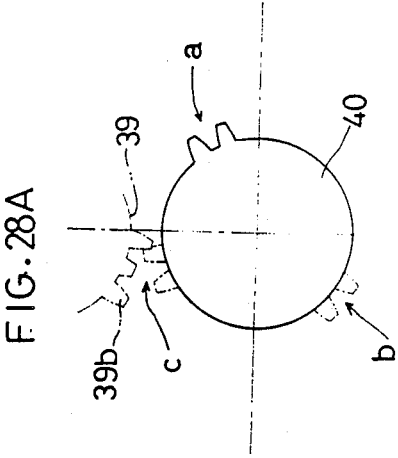
FIG. 28A  FIG. 28B  FIG. 28C

FOCAL LENGTH SWITCH-OVER CAMERA

This application is a continuation, of application Ser. No. 137,092, filed Dec. 23, 1987.

BACKGROUND OF THE INVENTION

1. Field of the Invention

The present invention relates to a focal length switch-over camera cable of e.g. standard photography and telephotography, or the standard photography and a wide-angle photography, and more particularly to a camera of the above-mentioned type having control means capable of effecting a switch-over of the focal length of, and a focus adjustment, of a photographic optical system in a serial and continuous manner.

2. Description of the Prior Art

There is a known focal length switch-over camera of the above-mentioned type having control means constituted by a screw member extending in a direction of optical axis and a mount plate of the photographic optical system engaging the screw member. In the case of this conventional camera, the focal length switch-over operation and the focus adjustment operation in the respective focal length conditions are carried out by drivably rotating the screw member by means of a motor or the like thereby moving the photographic optical system mounted on the mount plate in the direction of the optical axis. See e.g. a Japanese patent application published under SHOWA No. 60-122931.

However, this camera has problems to be described hereinafter.

The amount of movement of the photographic optical system for switching over the focal length thereof is generally larger than that of the same system for effecting a focus adjustment in the respective focal length conditions. Also, this movement amount of the photographic optical system for effecting a focus adjustment in the respective focal length conditions increases with an increase in the focal length.

Therefore, in the conventional control means, the screw member is employed for moving and fixedly positioning the photographic optical system. This screw member has a thread pitch uniform over its whole length and thus the movement amount of the photographic optical system relative to the rotational amount of the screw member is always the same. Therefore, unless the motor is of the variable speed type, thereby complicating the control of the same, and if the thread pitch of the screw member is small for effecting with a high precision the focus adjustment operation in the shorter focal length condition in which the movement amount of the photographic optical system is small, the focus adjustment operation and the focal length switch-over operation in the longer focal length condition takes a long time. On the other hand, if the thread pitch of the screw member is large for effecting more speedily the focal length switch-over operation and the focus adjustment operation in the longer focal length condition in which the movement amount of the photographic optical system is large, it becomes difficult to effect with a high precision the focus adjustment operation in the shorter focal length condition.

Further, generally in the case of the camera of the above type, it is necessary to detect a delivery position of the photographic optical system in effecting a focus adjustment operation and thus there is provided a detecting device for detecting this position of the photographic optical system. A conventional position detecting device of this kind includes a position detecting member attached to the photographic optical system and a sensor for detecting a passage or a contact of the member. In this case, it is necessary to reserve space specially for disposing the member to be attached to the photographic optical system and for the sensor, whereby it becomes difficult to form the camera compact.

There is also a known focal length switch-over mechanism for switching over a focal length by sliding along an optical axis a fore-element of the photographic optical system between a position projected from a camera body and a position receded from the same.

This focal length switch-over mechanism includes a screw member extending in the direction of the optical axis and a mount plate for the optical system. In operation, the focal length switch-over operation and the focus adjustment operation in the respective focal length conditions are carried out by drivably rotating the screw member by means of a motor or the like thereby moving the optical system mounted on the plate in the direction of the optical axis.

However, in the case of a camera having such focal length switch-over mechanism, the movement amount of the fore-element for switching over the focal length is relatively large. Thus, a member, e.g. a movable lens barrel, for supporting the fore-element at its projected position projects considerably from the camera body. Accordingly, this projecting portion of the camera is very likely to be subjected to external shocks, and especially when the camera is placed with the fore-element being positioned downwardly, the total weight of the camera body is applied to this projecting portion. Moreover, since the screw member of the focal length switch-over mechanism and the mount plate for the fore-element are constantly coupled with each other, if, as described above, any shocks or external forces are applied to the portion considerably projected from the camera body, all the shocks and forces are directly transmitted to the focal length switch-over mechanism thereby often damaging the same.

SUMMARY OF THE INVENTION

Taking the above state of the art into consideration, it is the primary object of the present invention to provide an improved focal length switch-over camera capable of effecting with a high precision a focus adjustment operation in a short focal length condition and effecting quickly a focus adjustment operation and a focal length switch-over operation in a long focal length condition and also to form a compact camera having the above features.

In order to accomplish the above object, a focal length switch-over camera according to a preferred embodiment of the present invention comprises control means, cam means operatively connected with the control means, a first cam face defined on the cam means for effecting a focus adjustment in a first focal length, a second cam face defined on the cam means and aligned with the first cam face in an operative direction of the cam means for switching over from the first focal length to a second focal length, a third cam face defined on the cam means and aligned with the second cam face in the operative direction of the cam means for effecting a focus adjustment in the second focal length and cam follower means driven by the first through third cam faces and connected with the photographic optical system to drive the same.

According to a further embodiment of the present invention, the second cam face is aligned with the first cam face in the peripheral direction, and the third cam face is aligned with the second cam face in the peripheral direction, these cam faces are peripherally divided into at least two portions and further the cam follower means includes cam follower members corresponding respectively to the divided portions.

That is to say, according to the above two embodiments, since the respective cam faces for switching over a focal length and for effecting a focus adjustment in the two focal length conditions may be formed with different slopes relative to the operative or rotational direction of the cam, a movement amount of the cam follower of the photographic optical system relative to an operative amount of the cam may be conveniently set.

Accordingly, even with the cam being operated at a constant speed, it is possible to increase the amount of the movement of the cam follower of the photographic optical system e.g. by forming the cam face for the focal length switch-over operation with forming a comparatively large angle relative to the operative or rotational direction of the cam, whereby the focal length switch-over operation of the photographic optical system may be carried out quickly. Also, by forming the cam face for effecting the focus adjustment in the long focal length condition and the cam face for effecting that in the short focal length condition with comparatively small angles relative to the operative or rotational direction of the cam, it becomes possible to gradually move the cam follower of the photographic optical system by a very small amount, whereby the focus adjustment operations of the photographic optical system in the long and short focal length conditions may be carried out with a high precision.

Moreover, e.g. by forming the angle of the cam face for the long focal distance focus adjustment larger than that of the cam face for the short focal distance focus adjustment, the focus adjustment operation may be carried out with a high precision in the short focal length condition and the same may be carried out quickly in the long focal length condition.

Further, even if the focal length switch-over operation and the focus adjustment operations in the respective focal length conditions are to be carried out by a driving force of a single motor, a fixed speed type motor may be employed since it is not necessary to vary the rotational speed of the motor. Accordingly, the coupling construction between the motor and the photographic optical system may be simplified thereby reducing the number of elements and forming a compact camera.

Further according to the second embodiment, since the peripheral face of the cam is divided in the peripheral direction into a plurality of portions, all of the plurality of divided peripheral faces constituted by the cam face for the focal length switch-over and the cam faces for the focus adjustments in the respective focal length conditions may be formed adjacent the outer periphery of the cam.

Accordingly, compared with the single undivided cam face of the prior art, since the cam of the present invention has a peripheral length gradually increasing towards its outer periphery with respect to the same rotational angle, by forming the respective cam faces adjacent the outer periphery, it becomes possible for the cam to have a larger operative range relative to its rotational angle without enlarging the radius of the cam.

Consequently, the construction becomes less likely to be affected by manufacturing or mounting errors of the its components and the focal length switchover operation and the focus adjustment operations in the respective focal length conditions may be carried out with a higher precision.

According to a further development of the present invention, a sensor for detecting a position of the cam in the operative direction thereof is provided between the cam and a fixing member of the camera. By incorporating the position detecting sensor in the space disposing the cam, the space may be efficiently utilized thereby further contributing to forming a camera compact.

Further, this cam per se shifts the photographic optical system, and by providing this sensor between this cam and the fixing portion, it becomes unnecessary to dispose any intermediate elements for detecting the position of the optical system, whereby the detection precision may be improved.

According to a still further development of the invention, there is provided a camera capable of switching over a focal length as at least a front portion of a photographic optical system shifts along a direction of an optical axis thereof between a position projected from a camera body and a position receded from the camera body. This camera comprises an urging member for urging the front portion towards the position projected from the camera body and a control mechanism capable of shifting the front portion towards the position receded from the camera body against an urging force of the urging member and capable of permitting the front portion to further shift away from the mechanism towards the direction exceeding the shift amount.

With the above construction, when the fore-element is at its projected position, even if the member holding this fore-element is subjected to shocks or to the total weight of the camera body when the camera is placed with this fore-element side being positioned downwardly, since the controlled member of the control mechanism constituting the focal length switch-over mechanism is moved towards the receded position relative to the controlling member against the urging force of the urging member, it becomes possible to prevent the focal distance switch-over mechanism from being subjected to any extreme external forces.

With disappearance of the force, the controlled member of the control mechanism returns to its original position by the urging force of the urging member and the fore-element of the photographic optical system also returns to its original position thereby the focal length returns to its original state.

Accordingly, it becomes possible to prevent any damages to the focal length switch-over mechanism without interfering with a smooth photography operation.

BRIEF DESCRIPTION OF THE DRAWINGS

The present invention is hereinafter more specifically described with reference to exemplary embodiments depicted in the drawings, in which:

FIG. 1 is an overall plane view,

FIGS. 3A and 3B are back view of a shutter block with FIG. 3A showing a standard photography condition and FIG. 3B showing a telephotography condition, FIGS. 27A through 27C are side views of the switch-over lever, with FIG. 27A showing the same in the standard photography condition, FIG. 27B showing the same in the course of a focal length switchover operation and FIG. 27C showing the same in the telephotography condition, respectively, FIGS. 28A through 28C are views showing relationship between a bevel gear portion of the switch-over control lever and a gear portion of the bevel gear developed along a line X—X in FIG. 25A, with FIG. 28A showing the same in the standard photography condition, FIG. 28B showing the same in the course of a focal length switch-over operation and FIG. 28C showing the same in the telephotography condition, respectively, FIG. 30 is a plane view of a portion of a camera having a switch-over control member according to another embodiment of the present invention.

DESCRIPTION OF THE PREFERRED EMBODIMENTS

Figure 2A:
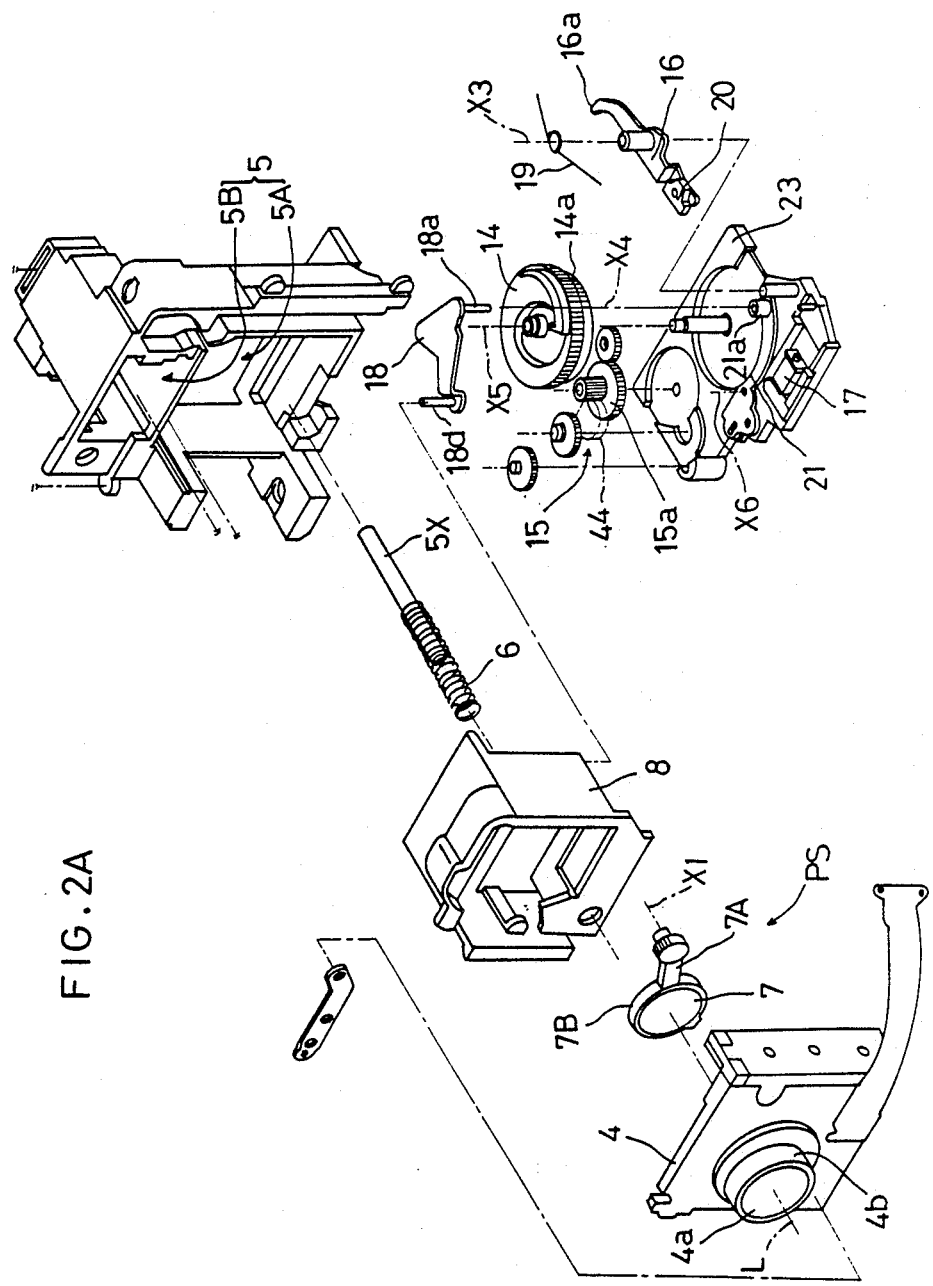
FIG. 2A is an exploded perspective view of a photographic optical system.

Preferred embodiments of the present invention will be particularly described hereinafter with reference to the accompanying drawings.

The following embodiments will be described as embodied in a bifocal photographic camera by way of example of a focal length switch-over camera. Needless to say, the present invention may be embodied in other multi-step focal length switchover camera such as a trifocal camera.

FIG. 1 is a top plane view of the photographic camera related to the present invention. In the same figure, a reference numeral 1 denotes a shutter release button, and a reference numeral 2 denotes a focal length switchover button as a switchover operative member for switching over a focal length of a photographic optical system PS to be described later.

With each depressing operation of this focal length switch-over button 2, the focal length of the photography optical system PS is switched over between a standard photography condition with e.g. 50 mm focal length and a telephotography condition with e.g. 70 mm focal length.

It is to be noted that the above focal length switch-over button 2 may be replaced by a slide type focal length switch-over lever 2' as the switch-over operative member as shown in FIG. 30. In this case, by setting this focal length switch-over lever 2' to a position 'TELE', there is provided the telephotography condition and by setting the same to a position 'STND', there is provided the standard photography condition. Further, if this lever is set to a position 'OFF', the supply of electricity to the respective components of the camera is stopped.

The photographic optical system PS is accommodated in a camera body 3 and in a fixed lens barrel 3A attached to the same. From a leading edge of this fixed lens barrel 3A, there is projected a leading edge of a main lens frame 4b held by a shutter block 4 to be described later. Though it will be described more particularly later, the main lens frame 4b is at a position indicated by a broken line in the same figure in the standard photography condition and is at a position indicated by an alternate long and two short dashes line in the telephotography condition.

Figure 2B:
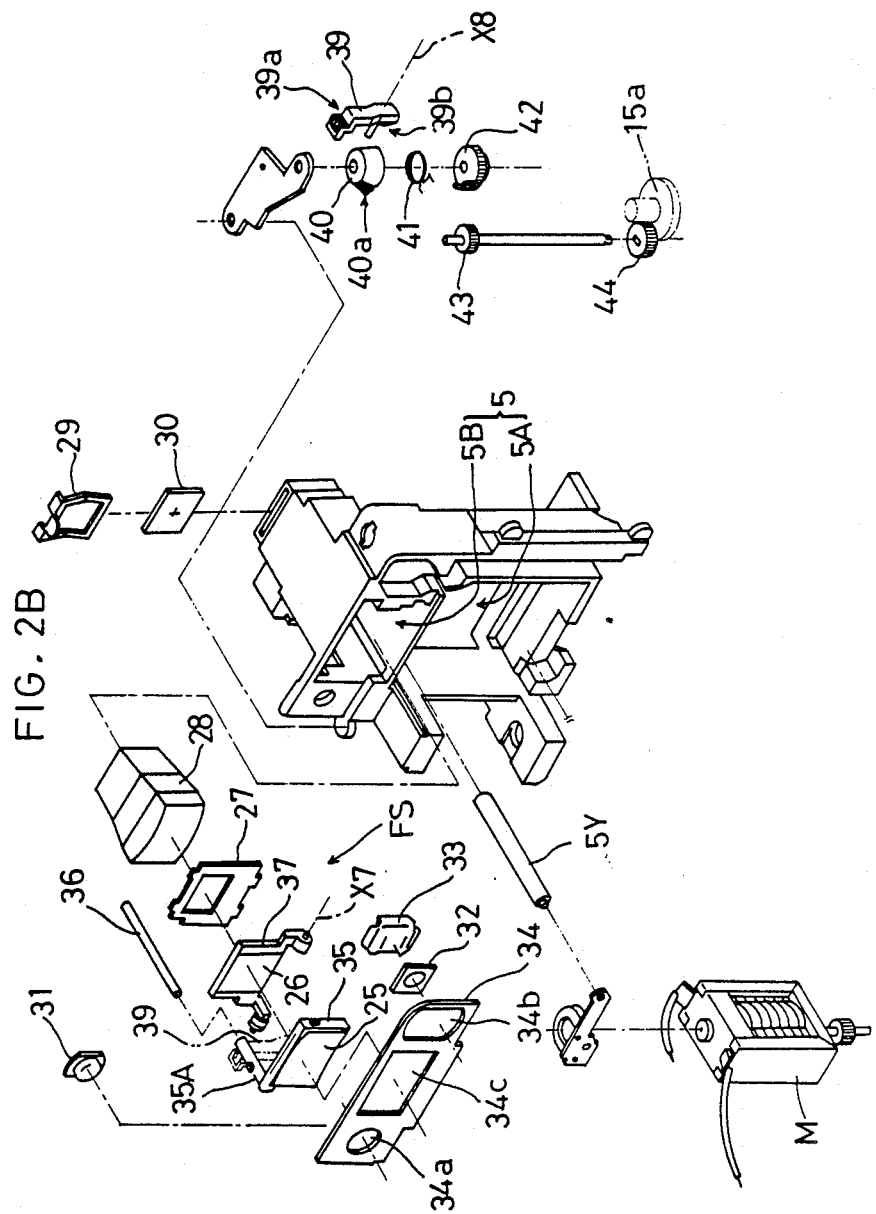
FIG. 2B is an exploded perspective view of a finder optical system.

FIG. 2A shows an overall construction of the photographic optical system PS, and FIG. 2B shows that of a finder optical system FS to be described later.

Referring more particularly to the shutter block 4, this shutter block 4 integrally includes a main lens unit 4a used both in the standard photography condition and the telephotography condition, the main lens frame 4b holding this main lens unit 4a as a fore element of the photographic optical system PS and a shutter not shown. The shutter block 4 is supported by a pair of shafts 5X and 5Y secured to a fixing mount plate 5 to be freely slidable in the direction of an optical axis L and at the same time the block 4 is forwardly urged by means of a spring 6.

To this shutter block 4, there is attached an auxiliary lens unit 7 supported by a support lever 7A freely rotatable about an axis X1 parallel to the optical path L to be inserted into a photographic optical path only in the telephotography condition. Further, to this shutter block 4, there is fixedly attached a movable lens barrel 8 covering the auxiliary lens unit 7 and inwardly engaged with a lower half portion 5A which is a first attaching frame shaped as a cylinder having an angular or circular cross section for the fixing mount plate 5 formed integrally therewith, whereby both the movable lens barrel 8 and the shutter block 4 are slidable in the direction of the optical axis L and forwardly urged by the spring 6.

Figure 4:
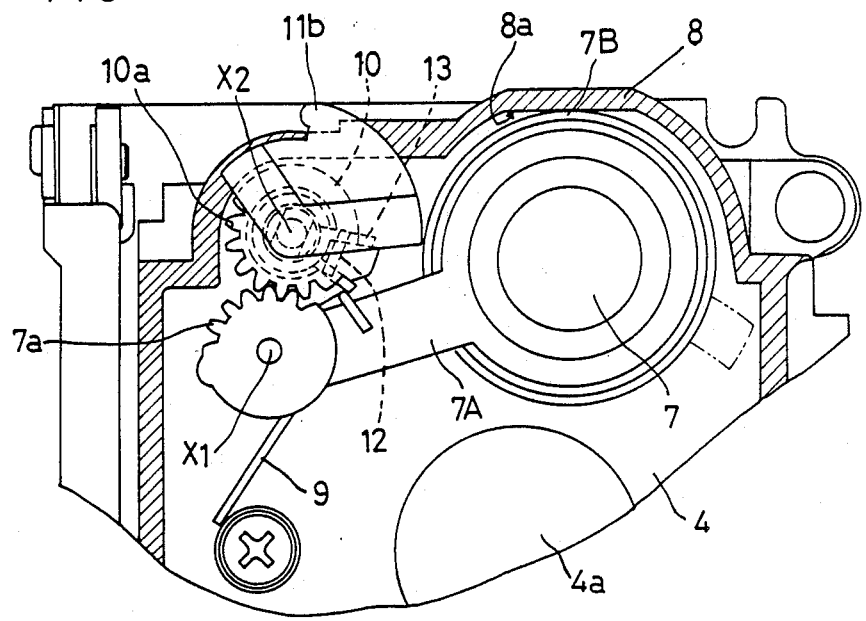
FIG. 4 is a back view showing in an enlarged scale a main portion of the shutter block in the standard photography condition.

As shown in FIGS. 3A, 3B and also in FIG. 4, the support leveler 7A for the auxiliary lens unit 7 is urged by means of a spring 9 to move the auxiliary lens unit 7 into the photographic optical path. In an outer peripheral face of an axis portion of the support lever 7A, there is formed a gear portion 7a. There is also provided a fan-shaped control member 11 pivotable about an axis X2 in unison with a gear member 10 having a gear portion 10a meshing the gear portion 7a.

Figure 5:
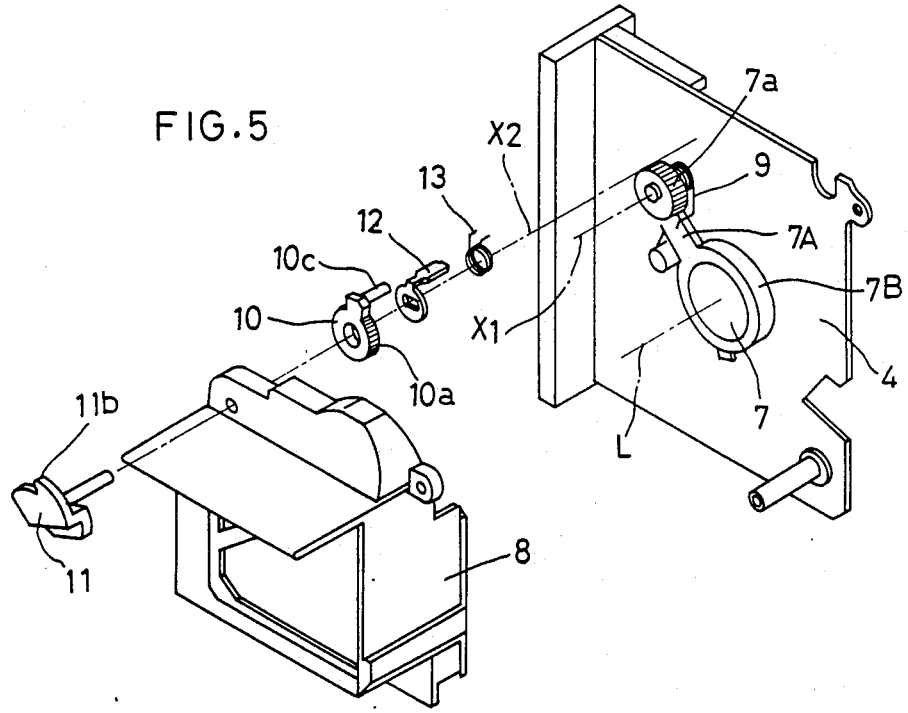
FIG. 5 is an exploded perspective view showing the shutter block, a movable lens barrel and a portion of projecting and receding means for an auxiliary lens unit.
Figure 6:
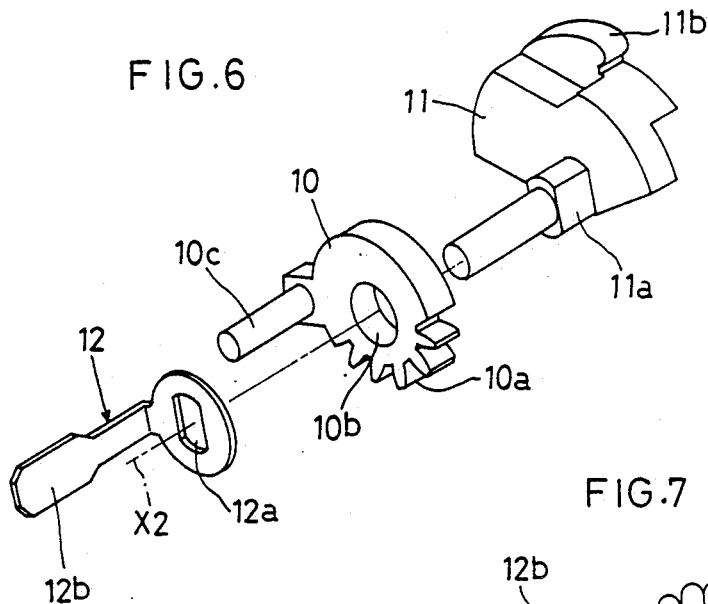
FIG. 6 is an exploded perspective view showing the portion of the projecting and receding means for the auxiliary lens unit.
Figure 7:
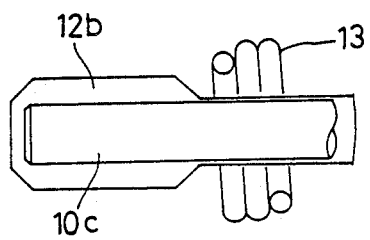
FIG. 7 is a side view showing in an enlarged scale the portion of the projecting and receding means for the auxiliary lens unit.

As shown in FIGS. 5 and 6, this control member 11 includes an axis portion 11a having an elliptical cross section. This axis portion 11a is inserted through a circular hole 10b of the gear member 10 to be rotatable relative to each other and the portion 11a is further engaged into an elliptical hole 12a of an intermediate member 12 to be unrotatable in relation to each other. As shown in FIG. 5 and 7, an arm portion 12b of this intermediate member 12 and an arm portion 10C of the gear member 10 are superposed on each other and there is provided a coil spring 13 having bent ends for binding the both arm portions.

Referring back to FIG. 4, as the control member 11 is rotated clockwise, the intermediate member 12 and the gear member 10 coupled by means of a spring with the member 12 are rotated in the same direction. On the other hand, through meshing between the gear portion 10a of the gear member 10 and the gear portion 7a of the support lever 7A, the support lever 7A is rotated counterclockwise, whereby the auxiliary lens unit 7 is recessed from the photographic optical path.

In this condition, the control member 11 as a controlling member is coupled by means of spring with the gear member 10 as a controlled member to be rotatable relative to each other so that the control member 11 may be freely moved in a direction that the member 11 retracts the auxiliary lens unit 7 even after the holder 7B of the auxiliary lens unit 7 comes into contact with an upper frame 8a of the movable lens barrel 8. With the above construction, it is possible to minimize the space for causing the auxiliary lens unit 7 to recede from the photographic optical path and at the same time to reserve a large operative range for the control member 11. As the result, the auxiliary lens unit 7 may be reliably receded from the optical path in spite of possible manufacturing or mounting tolerances of the components constituting the receding mechanism for the auxiliary lens unit 7.

Figure 8:
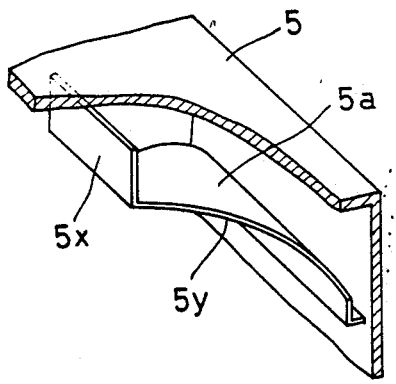
FIG. 8 is a perspective view of a cam face of a fixing mount plate.
Figure 10:
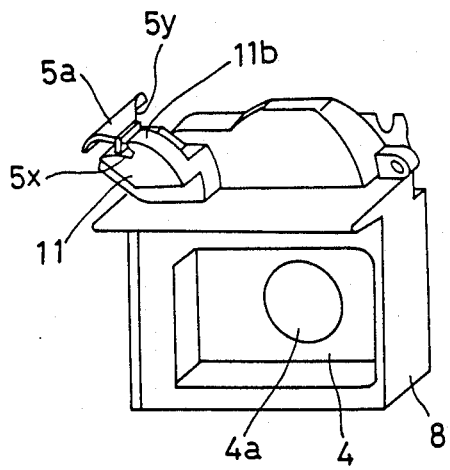
FIG. 10 is a perspective view showing the photographic optical system in the standard photography condition.

As shown in FIGS. 5 and 10, this control member 11 projects from an upper face of the movable lens barrel 8 to the outside. And, as shown in FIG. 8 and 10, inside the fixing mount plate 5, there is integrally formed a cam face 5a to come into contact with a controlling projection 11b of the control member 11 with a movement of the shutter block 4 in the direction of the optical axis L thereby causing the auxiliary lens unit 7 to recede from the photographic optical path.

Figure 9A:
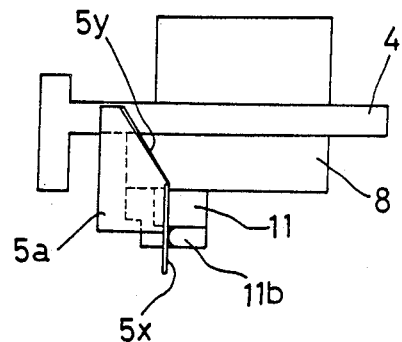
FIGS. 9A through 9C are schematic plane views illustrating relationship among the shutter block, the movable lens barrel and the projecting and receding means for the auxiliary lens unit, with FIG. 9A showing the standard photography condition, FIG. 9B showing focal length switchover operation and FIG. 9C showing the tele photography condition, respectively.

In the standard photography condition, as shown in FIGS. 3A, 9A and 10, the controlling projection 11b of the control member 11 is in contact with a flat portion 5x of the cam face 5a of the fixing mount plate 5. In this condition, the control member 11 is rotated to and held at its clockwise extreme end position, and the auxiliary lens unit 7 is recessed from the photographic optical path against the urging force of the spring 9.

The flat portion 5x of the cam face 5a is formed in parallel with the optical axis L and has a certain length in this direction. That is to say, when the shutter block 4 and the movable lens barrel 8 are moved forwardly or backwardly in the direction of the optical axis L in order to effect a focus adjustment as will be more particularly described later, the auxiliary lens unit 7 is fixedly maintained at its recessed position from the photographic optical path.

Figure 9B:
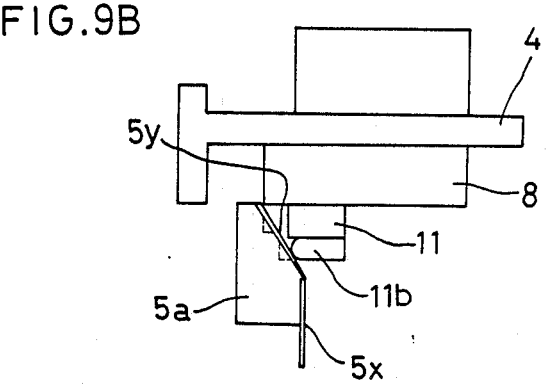

The cam face 5a has a curved portion 5y curved so as to depart from the optical axis L following the flat portion 5x. From the above-described standard photography position, if the shutter block 4 and the movable lens barrel 8 are moved together forwardly along the optical axis L, the controlling projection 11b of the control member 11 rotationally urged counterclockwise in connection with the support lever 7A rotationally urged clockwise by means of the spring 9 in FIGS. 3A, 3B and 4, comes out of its contact with the flat portion 5x of the cam face 5a to come into contact with the curved portion 5y as shown in FIG. 9B.

Figure 9C:
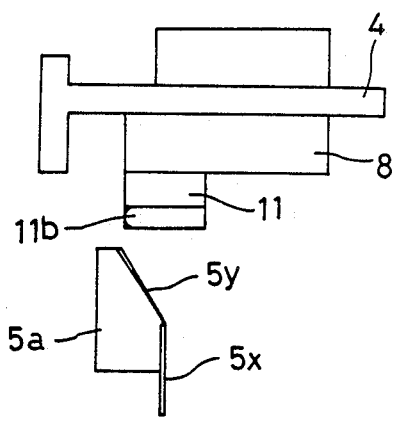

Thereby, the support lever 7A is rotated clockwise by the urging force of the spring 9 and the auxiliary lens unit 7 is inserted into the photographic optical path and fixedly positioned as coming into contact with a pin 4b implanted in the shutter block 4, thereby providing the tele photography condition, which condition is shown in FIG. 3B and in FIG. 9C.

In this condition, since the controlling projection 11b of the control member 11 leaves the cam face 5a of the fixing mount plate 5, the shutter block 4 and the movable lens barrel 8 are moved forwardly or backwardly in the direction of the optical axis 'L' for effecting a focus adjustment, the block and the barrel do not come into contact with the cam face 5a. That is to say, in the telephotography condition, the auxiliary lens unit 7 is fixedly maintained in the photographic optical path.

The above support lever 7A of the auxiliary lens unit 7, spring 9, pin 4b of the shutter block 4, gear member 10, intermediate member 12, upper frame 8a of the movable lens barrel 8 and the cam face 5a of the fixing mount plate 5 together constitute projecting-receding means for selectively moving and fixedly maintaining there at the auxiliary lens unit 7 between its projected position and its receded position.

Referring back to FIGS. 2A and 2B, at a side of the fixing mount plate 5, there is provided a motor M. Also, downwardly of the lower half portion 5A of the fixing mount plate 5, there is provided a gear mount plate 23 secured by means of a screw to the fixing mount plate 5.

On this gear mount plate 23, there is mounted a drive mechanism for the photographic optical system PS including a delivery cam 14, a gear train 15 for transmitting a rotational drive of the motor M to the rotational delivery cam 14, a stop lever 16 having a claw 16a engaging a ratchet portion 14a formed on an outer peripheral face of the delivery cam 14, a magnet 17 for controlling movements of the stop lever 16 and a delivery lever 18 acting as a cam follower of the photographic optical system PS for the delivery cam 14.

The stop lever 16 is freely rotatable about an axis X3, and there is provided a spring 19 for urging this stop lever 16 counterclockwise in FIG. 2A, i.e. to the direction in which the claw 16a comes into engagement with the ratchet portion 14a of the delivery cam 14. Further, to an end portion of this stop lever 16 opposed to the claw 16a relative to the attaching axis X3, there is attached an iron piece 20 to be attracted by the magnet 17.

In operation, by energizing this magnet 17 to attract the iron piece 20, the engagement between the claw 16a of the stop lever 16 and the ratchet portion 14a of the delivery cam 14 is inhibited thereby permitting in turn the rotation of the delivery cam 14. On the other hand, by de-energizing the magnet 17 to cause the stop lever 16 to be rotated counterclockwise by means of the urging force of the spring 19, the claw 16a comes into engagement with the ratchet portion 14a of the delivery cam 14, thereby inhibiting in turn the rotation of the delivery cam 14.

Figure 11:
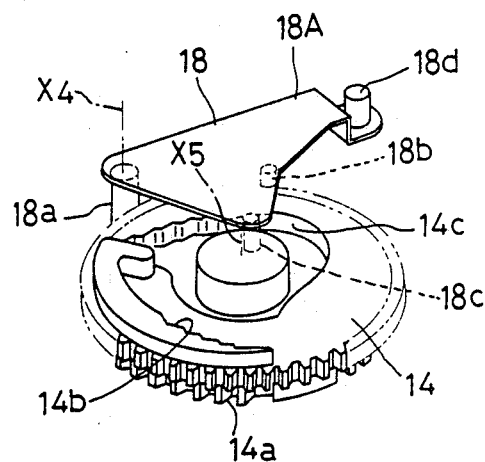
FIG. 11 is a perspective view showing a delivery cam and a delivery lever.
Figure 12:
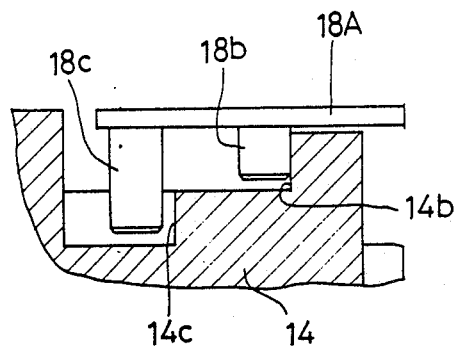
FIG. 12 is a sectional view showing the delivery cam and the delivery lever.

As shown in FIG. 11, on a lower face of the delivery lever 18, there are implanted a first pin 18a pivotably supported by a pivot portion 21a of a support lever 21 attached to the gear mount plate 23 and two other pins, a second pin 18b and a third pin 18c. Further, there is also implanted a fourth pin 18d on an upper face at a free end side of the delivery lever 18 pivotable about an axis X4 of the first pin 18a.

The second pin 18b and the third pin 18c respectively come into engagement with a pair of cam faces, a first cam face 14b, a second cam face 14c formed on an inner periphery of the delivery cam 14. On the other hand, the fourth pin 18d is engagement with an elongate slot 8a (not shown in FIG. 2) defined in a lower face of the movable lens barrel 8 and extending in a direction perpendicular to the optical axis L.

That is to say, when the delivery lever 18 is maintained at its predetermined position as its second pin 18b or its third pin 18c comes into contact with the cam faces 14b and 14c of the delivery cam 14, the fourth pin 18d engaging the movable lens barrel 8 acting as a holder frame for the photographic optical system PS regulates the movement of the shutter block 4 forwardly urged by the spring 6 and fixedly positions the same. This operation will be more particularly described later.

As described hereinbefore, in the tele photography condition, the main lens frame 4b for holding the main lens unit 4a acting as the fore element of the photographic optical system PS and attached to the shutter block 4 is at its projected position projected from the camera body 3 as indicated by the two long and short dashes line in FIG. 1. In this condition, the shutter block 4 is fixedly positioned by the spring 6 for forwardly urging the shutter block 4 together with the main lens unit 4a and by the mechanism for sliding the main lens unit 4a towards its recessed position against the urging force of the spring 6, i.e. the control mechanism constituted by the interlocking of the motor M, the gear train 15, the delivery cam 14 and the delivery lever 18.

As shown in FIG. 11, since the pivotal movement of the delivery lever 18 towards its recessed position is permitted as the pair of pins 18b and 18c of the delivery lever 18 corresponding respectively to the pair of cam faces 14b and 14c of the delivery cam 14 come into one-side contact with the same, even if the shutter block 4 for holding the main lens unit 4a in the telephotography condition is subjected to an external force and e.g. the camera is placed with the shutter block 4 being positioned downwardly, the lever 18 is oscillated to leave the delivery cam 14. Therefore, it is possible to prevent the control mechanism from being subjected to an extreme external force, thereby protecting the mechanism from the damages.

As will be more particularly described later in the description of operations, with a normal or reverse rotation of the motor M, the delivery cam 14 is rotated in a normal or reverse direction and in connection with this rotation, the delivery lever 18 is shifted to fixedly position the shutter block 4 through the movable lens barrel 8, whereby the main lens unit 4a is moved along the direction of the optical axis L and the auxiliary lens unit 7 is projected into or receded from the photographic optical path.

The drive of the motor M also effects the focal length switch-over between the standard photography condition and the telephotography condition, and further, in the two respective photography conditions, the drive of the motor M moves the main lens unit 4a thereby effecting a focus adjustment operation.

That is to say, the gear train 15, delivery cam 14, delivery lever 18, stop lever 16, magnet 17, motor M and so on together with constitute control means for effecting in succession the focal length switch-over operation of the photographic optical system PS and the focus adjustment operation in the respective local length condition.

In the above operations, by urging the shutter block 4 forwardly and fixedly positioning the same by the delivery lever 18 having the pair of pins 18b, 18c respectively coming into contact with the pair of cam faces 14b and 14c of the delivery cam 14, it is possible to provide the cam faces 14b and 14c with an inclination angle relative to the operative direction of the cam 14 suitable for a required moving speed of the shutter block 4 (e.g. the speed may be faster in a focus adjustment operation in the telephotography condition than in that in the standard photography condition, or the speed may be faster in a focal length switch-over operation than in a focus adjustment operation) in a tangential direction of the rotational track of the delivery cam 14, i.e. the inclination angle of the cam faces 14b and 14c relative to the operative direction of the cam 14. As the result, the focal length switch-over operation in photographing may be carried out speedily and the focus adjustment operation may be carried out with a high precision.

The first cam face 14b of the delivery cam 14 and the second pin 18b of the control lever 18 coming into contact therewith effect the focus adjustment operation of the photographic optical system PS in the standard photography condition and a former half of the focal length switch-over operation from the standard photography condition to the telephotography condition.

On the other hand, the second cam face 14c of the delivery cam 14 and the third pin 18c of the control lever 18 coming into contact therewith effect the latter half of the focal length switchover operation from the standard photography condition to the tele photography condition and also the focus adjustment operation in the telephotography condition.

More particularly, the first cam face 14b of the delivery cam 14 forms an end portion of a short focal length focus adjustment cam face 14X and a focal length switch-over cam face 14Y; whereas, the second cam face 14c forms the other end of the focal length switch-over cam face 14Y and a long focal length focus adjustment cam face 14Z.

These short focal length focus adjustment cam face 14X, focal length switch-over cam face 14Y and long focal length focus adjustment cam face 14Z are disposed in this order in the rotational direction of the delivery cam 14, i.e. in the operative direction of this cam 14.

By dividing the cam face into the first cam face 14b and the second cam face 14c, it becomes possible to reduce operational errors of the delivery lever 18 acting as the cam follower.

That is to say, if the cam face is formed as one, an end of this cam face is formed adjacent a rotational axis X5 of the delivery cam 14. In this case, a peripheral length of the cam face relative to a predetermined rotational angle of the delivery cam 14 becomes relatively short. Then, the cam face formed adjacent the rotational axis X5 of the delivery cam 14 will have a large error relative to the same rotational angle error in comparison with the cam face formed adjacent the outer peripheral face of the delivery cam 14, and therefore, the delivery lever 18 will have a larger operational error.

In contrast to this, by dividing the cam face as described above and transferring this in the course of the operation, it becomes possible to form the cam face only adjacent the other peripheral face of the delivery cam 14 thereby reducing the operational error as well.

Moreover, the first cam face 14b and the second cam face 14c constituting the divided peripheral faces of the rotational delivery cam 14 are positioned differently from each other in their depths from the uppermost face of the delivery cam 14, i.e. in the direction of the rotational axis X5 of the delivery cam 14. Also, in accordance therewith, the pair of pins 18b and 18c acting as cam follower portions respectively for the pair of divided peripheral faces 14b and 14c and attached to the delivery lever 18 acting as the cam follower project by different amounts from the mount plate 18A of the control lever 18.

That is to say, by dividing the cam faces 14b and 14c of the rotational delivery cam 14 to be two stepwise displaced in the direction of the rotational axis X5 of the delivery cam 14, it becomes possible to provide both of the cam faces 14b and 14c with large displacement widths relative to the radial direction of the delivery cam 14. Thus, these cam faces 14b and 14c for controlling the movements of the shutter block 4 may have large rotational angles relative to the rotational axis X5 of the delivery cam 14 in comparison with the amount of the linearly movements of the shutter block 4, whereby the operational errors may be reduced.

Figure 13:
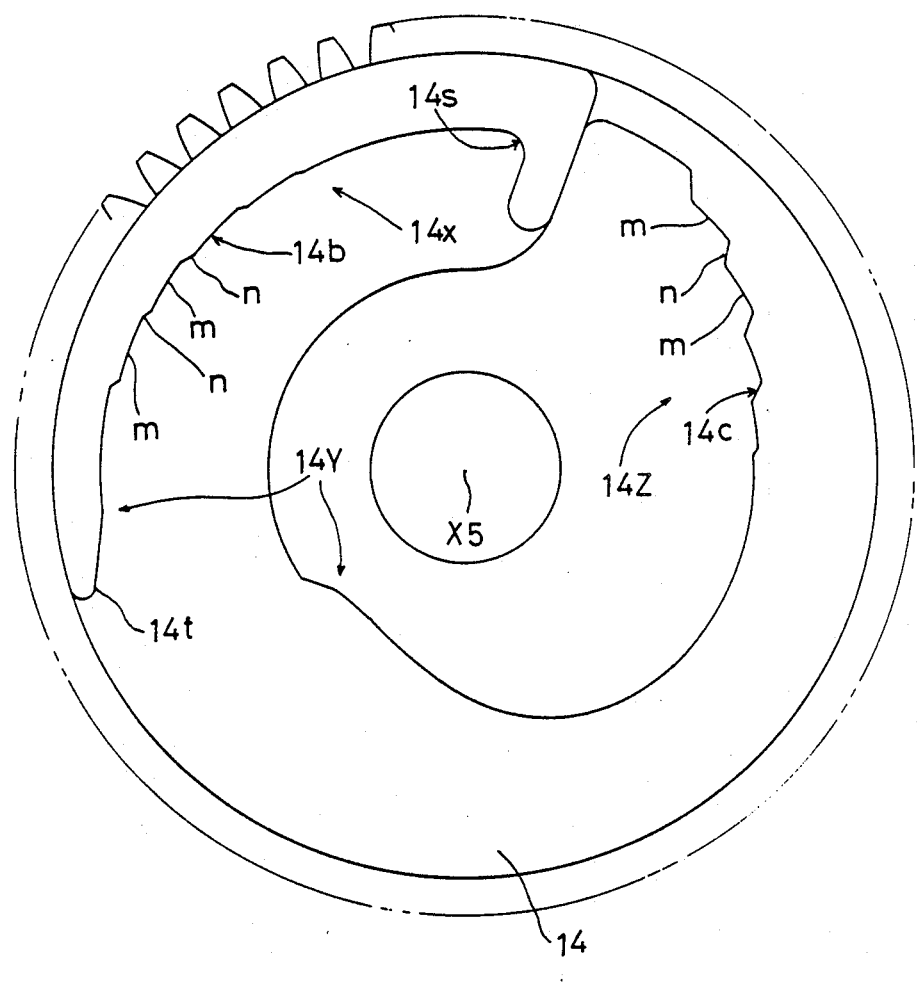
FIG. 13 is a plane view showing the delivery cam.

As shown in FIG. 13, in the pair of cam faces 14b, 14c of the delivery cam 14, their focus adjustment cam faces 14X and 14Z are formed by some cylindrical faces m differently distant from the rotational center X5 of the delivery cam 14 interconnected by means of inclined faces n provided therebetween.

These included faces n constitute an operative range within which the control lever 18 acting as the cam follower is activated to effect a focus adjustment operation; whereas, the cylindrical faces m constitute an inoperative range of the same. Also, it is to be noted, the fourth pin 18d of the control lever 18 acts as a focus adjustment member for the photographic optical system PS.

Nextly, the cylindrical faces m and the inclined faces n of the focus adjustment cam faces 14X and 14Z will be more particularly described.

Figure 14:
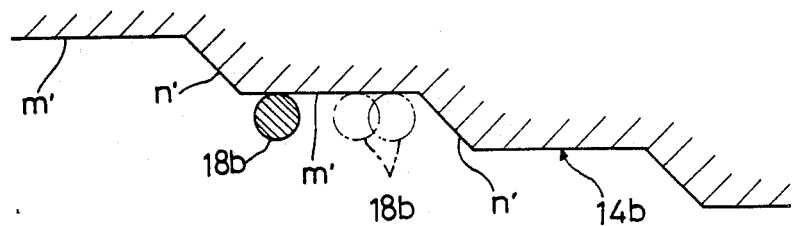
FIG. 14 is a developed view a cam face of the delivery cam for a focus adjustment in a short focal length condition.

FIG. 14 shows how the pair of cam faces 14b and 14c look if spread linearly, with only the linear spread of the first cam face 14b being shown. Since these cam faces are substantially same, only the first cam face 14b will be described hereinafter. Referring to the same figure, the cylindrical faces m correspond to straight portions m' extending in the right and left direction; whereas, the inclined faces n interconnecting the same correspond to inclined portions n' extending between adjacent straight portions m'.

The second pin 18b of the control lever 18 corresponding to this first cam face 14b, as shown in FIG. 14, comes into contact with a certain position of the straight portion m' in the longitudinal direction thereof (actually, a certain position in the peripheral direction of the cylindrical face m).

At whichever of the positions indicated by a solid line, an alternate long and short dash line and by an alternate long and two short dashes line the second pin 18b may be placed, the position of the delivery lever 18 does not change and those of the shutter block 4 and of the movable lens barrel 8 in the direction of the optical axis L do not change either. That is to say, the stop position of the rotation of the delivery cam 14 has a looseness in the peripheral direction. This looseness has advantages to be described next.

In a focus adjustment operation, for stopping the movement of the shutter block 4 in the direction of the optical axis L, the motor M is stopped thereby stopping the rotation of the delivery cam 14 and at the same time the magnet 17 is de-energized thereby engaging the claw 16a of the stop lever 16 with the ratchet portion 14a of the delivery cam 14.

In the above operation, if a battery as a power source is new and has a sufficiently high power voltage, the motor M provides a sufficiently strong driving force. Therefore, after the motor M is stopped, the delivery cam 14 is rotated by a predetermined amount thereby sufficiently engaging the claw 16a of the stop lever 16 with the ratchet portion 14a of the delivery cam 14. Then, the delivery cam 14 is fixedly positioned such that the second pin 18b of the delivery lever 18 may come into contact with the first cam face 14b of the delivery cam 14 at the position indicated by the solid line in FIG. 14.

On the other hand, if the battery is old and has a low power voltage, the driving force of the motor M decreases. Thus, after the motor M is stopped, the delivery cam 14 tends to be rotated by an amount smaller than the predetermined amount.

In this case, the delivery cam 14 is fixedly positioned before the claw 16a of the stop lever 16 comes into sufficient engagement with the ratchet portion 14a of the delivery cam 14. As the result, the second pin 18b of the delivery lever 18 comes into contact with the first cam face 14b of the delivery cam 14 at either of positions indicated by the long and short dash line or the long and two short dashes line in FIG. 14.

As described hereinbefore, as long as the second pin 18b of the control lever 18 comes into contact with the same straight portion m' of the first cam face 14b of the delivery cam 14, the positions of the shutter block 4 and of the movable lens barrel 8 in the direction of the optical axis L do not change. Therefore, even if there occur some irregularities in the stop position of the delivery cam 14 due to variations in the power voltage, the main lens unit 4a may be stably positioned.

Though not shown, it is to be noted here, the same arrangement is provided between the third pin 18c of the delivery lever 18 and the second cam face 14c of the delivery cam 14.

Figure 15:
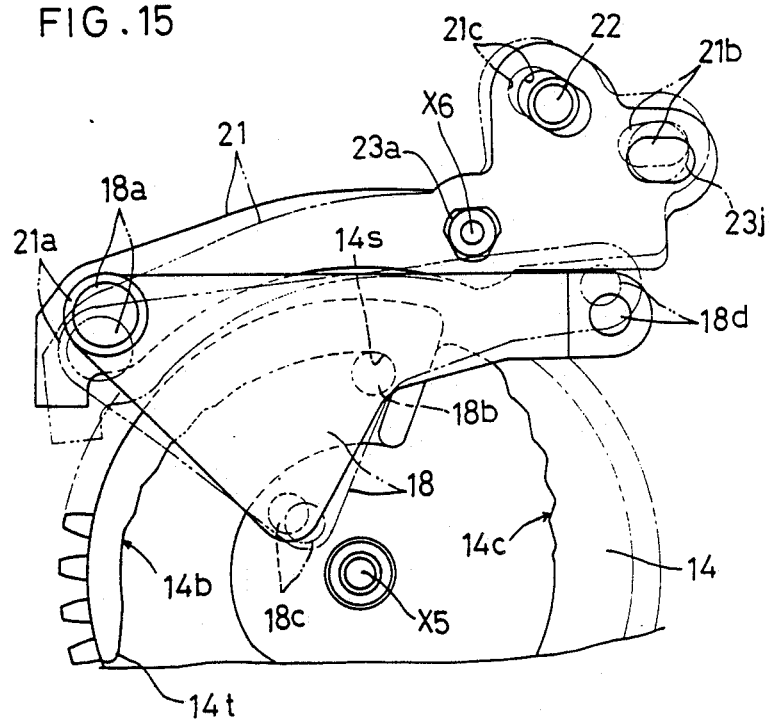
FIG. 15 is a plan view showing adjustment means of the delivery lever for a support lever.

On the other hand, the support lever 21 acting as a support member for rotatably supporting the delivery lever 18 by pivotably supporting the first pin 18a of the delivery lever 18, as shown in FIGS. 2A and 15, outwardly engages a pin 23a implanted on the gear mount plate 23 to be rotatable about an axis X6.

The support lever 21 defines an elongate slot 21b opposed to the pivot portion 21a across the rotational axis X6 thereof. On the other hand, the gear mount plate 23 defines at a portion corresponding to the elongate slot 21b a hole 23j having a diameter longer than the short axis of the elongate slot 21b.

The support lever 21 is oscillatable about the axis X6. Referring to how to rotatable mount this lever 21, an adjustment tool having a first cylindrical shaft having an outer radius as large as the inner radius of the hole 23j of the gear mount plate 23 and a second cylindrical shaft eccentrically attached to a leading edge of the first cylindrical shaft and having an outer radius engageable with the elongate slot 21b of the support lever 21 is inserted into the hole 23j of the gear mount plate 23 from under with only the second cylindrical shaft extending through the elongate slot 21b, and then the tool is rotated.

In the same figures, a reference numeral 22 denotes a fixing screw which extends through another elongate slot 21c defined in the support lever 21, and a screw portion thereof engages the gear mount plate 23.

That is to say, the construction in which the support lever 21 is oscillatable about the axis X6, the position adjusting elongate slot 21b and the fixing screw together constitute adjustment means for varying the position of the support lever 21 acting as a support member for the control lever 18 as the cam follower.

As the support lever 21 is oscillated about the axis X6, the position of its pivot portion 21a also changes. For example, if the support lever 21 is oscillated counterclockwise from a position indicated by a solid line in FIG. 15, the pivot portion 21a moves downwardly as indicated by two-dot-and-dash line in FIG. 15.

In this case, since the fourth pin 18d is in engagement with the movable lens barrel 8 and the second pin 18b is fixedly positioned as coming into contact with the first cam surface 14b of the delivery cam 14, the delivery lever 18 pivots counterclockwise about this second pin 18b. Therefore, as indicated by a two long and short dashes line in FIG. 15, the fourth pin 18d of the delivery lever 18 moves upwards in the same figure.

Thereby, the shutter block 4 and the movable lens barrel 8 urged forwardly in the direction of the optical axis L moves forwardly and then the main lens unit 4a changes its position.

In FIG. 15, the first pin 18b of the delivery cam 14 is positioned at a start end portion 14s of the first cam face 14b of the delivery cam 14. This position, through will be more particularly described later, corresponds to a condition in which the photographic optical system PS (in this case, the main lens unit 4a) is focused at its infinity position in the standard photography condition. In this condition, if there are no errors, the lens block 4 and the movable lens barrel 8 are positioned at the most rearward ends of their respective movable ranges.

And, as described hereinbefore, by changing the position of the main lens unit 4a through the oscillation of the support lever 21, regardless of errors due to manufacturing or mounting errors of the main lens unit 4a, it is possible to fine-adjust the position of the photographic optical system PS such that the system PS may be focused at the infinity position with the first pin 18b of the delivery lever 18 being placed at the start end portion 14s of the first cam face 14b of the delivery cam 14.

The position adjusting elongate slot 21b, one of the adjustment members constituting the adjustment means, is exposed to the outside of the control means. Therefore, the above-described fine adjustment operation of the photographic optical system PS may be readily carried out even after the control means is attached.

In FIG. 15, it is to be noted, there is shown the fine adjustment of the photographic optical system PS through the oscillation of the support lever 21 with the first pin 18b of the delivery lever 18 being in contact with the start end portion 14s of the first cam face 14b of the delivery cam 14. In place of this, it is also possible to carry out the fine adjustment with the second pin 18c of the delivery lever 18 being in contact with an end portion of the second cam face 14c of the delivery cam 14.

This position corresponds to a condition in which the photographic optical system PS (in this case the main lens unit 4a and the auxiliary lens unit 7) is focused at its closest focusing position. In this condition, if there are no errors, the shutter block 4 and the movable lens barrel 8 are positioned at the forwardmost ends in their respective movable ranges.

Figure 16:
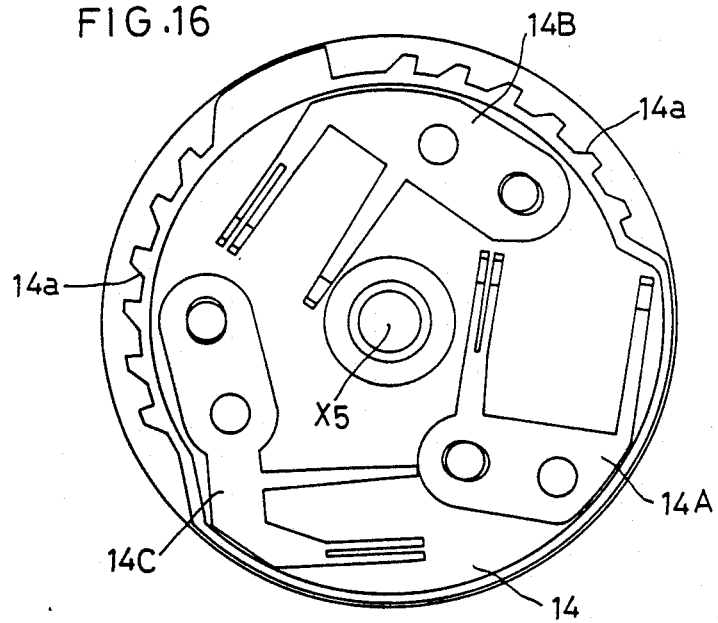
FIG. 16 is a plane view showing position detecting brushes of the delivery cam.
Figure 17:
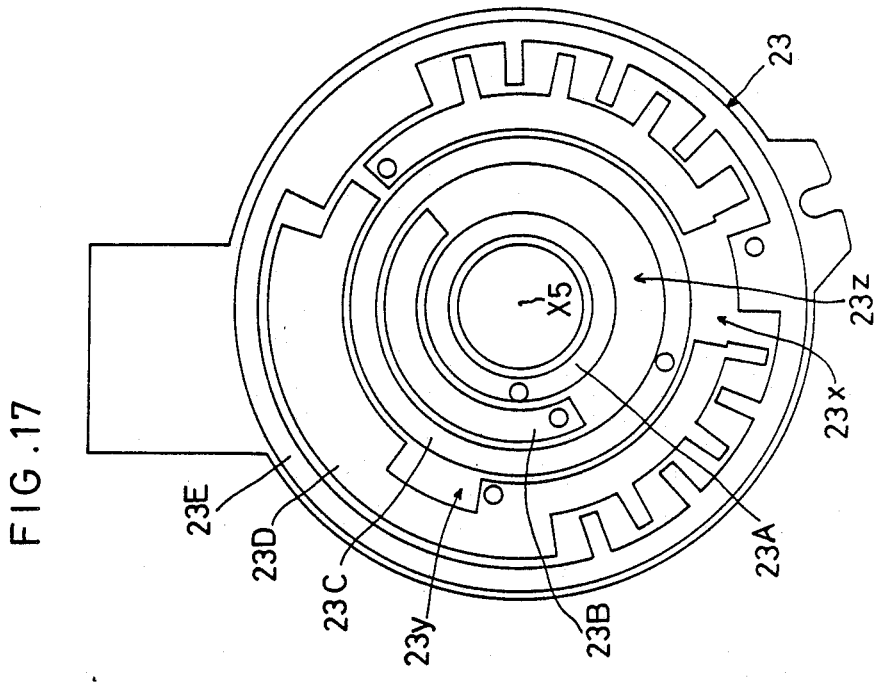
FIG. 17 is a plane view of a position detecting pattern of a gear mount plate.

As shown in FIG. 16, the lower face of the delivery cam 14 carries three position detecting brushes, a first brush 14A, a second brush 14B and a third brush 14C positioned differently each other in the peripheral direction thereof. On the other hand, as shown in FIG. 17, the upper face of the gear mount plate 23 acting as a fixing portion on which the delivery cam 14 is mounted carries a position detecting pattern for electrically opening and closing position detecting switches S3 through S5 together with constituting a cam position detecting sensor as selectively coming into contact with the three position detecting brushes 14A, 14B, 14C in accordance with a rotational position of the delivery cam 14. The position detecting switches S3 through S5 will be more particularly described later.

This position detecting pattern includes substantially concentric arc terminals 23A through 23E centering about the rotational axis X5 of the delivery cam.

The innermost arc terminal 23A and the arc terminal 23D in the fourth order from the inner most periphery and the second brush 14B together constitute a lens initial condition detecting switch S3 for detecting an initial state of the photographic optical system PS in the standard photography condition and also in the telephotography condition (in this embodiment, the condition in which the system is focused at its infinity). In operation, when the photographic optical system PS is at its initial state, and end of the second brush 14B comes into contact with one of non-conductive portions 23x and 23y off the arc terminal 23D and this lens initial condition detecting switch S3 is closed.

Projections of the arc terminal 23C in the third order from the innermost periphery and the arc terminals 23D and 23E in the fourth and fifth orders from the same respectively and the third brush 14C together with constitute the lens position detecting switch S4 for detecting an amount of movement of the shutter block 4 in the standard photography condition and also in the telephotography condition. In operation, this lens position detecting switch S4 repeatedly opens and closes to generate pulse signals in accordance with the rotation of the delivery cam 14 for moving the shutter block 4. Then, a control device 24 to be described later counts the pulse signals to detect the present position of the shutter block 4.

The arc terminal 23B in the second order from the innermost periphery and the outermost arc terminal 23E and the first brush 14A together with constitute the lens area detecting switch S5 for detecting under which of the standard photography condition or the telephotography condition the photographic optical system PS is currently set. In operation, when the photographic optical system PS is under the telephotography condition, i.e. the shutter block 4 is positioned forwardly in the direction of the optical axis L and at the same time the auxiliary lens unit 7 is in the photographic optical path, an end of the first brush 14A comes into contact with a nonconductive portion 23z off the arc terminal 23B, whereby this lens area detecting switch S5 is closed.

Figure 18:
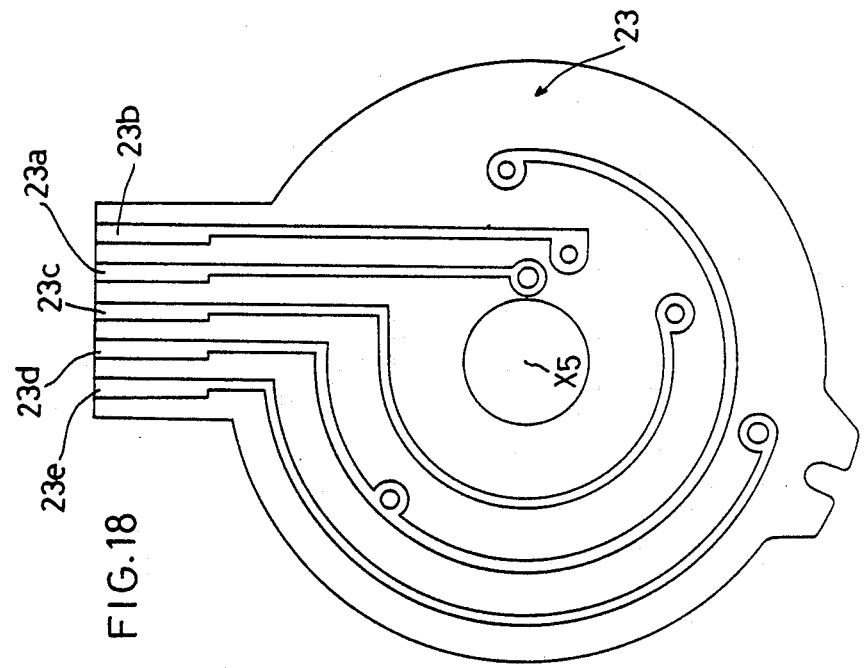
FIG. 18 is a bottom view of the gear mount plate.

As shown in FIG. 18, on the bottom face of the gear mount plate 23, a group of connecting terminals 23a through 23e respectively connected through holes to the arc terminal 23A through 23E are exposed to the outside from the gear mount plate 23.

Figure 19:
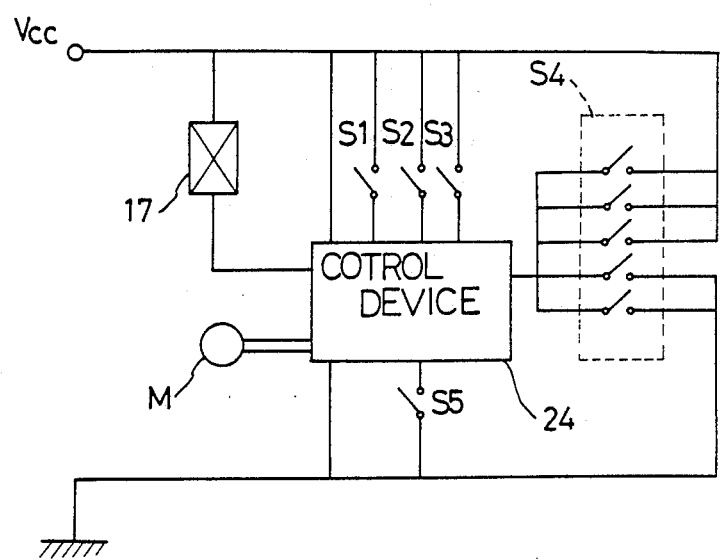
FIG. 19 is a diagram showing a peripheral circuit of a control device.

Referring now to FIG. 19, to the control device 24, there are connected the above-described three switches S3 through S5, the release switch S1 opened and closed in connection with an operation of the shutter release button 1 and the lens switch-over switch S2 opened and closed in connection with an operation of the focal length switch-over button 2 or the lever 2'.

To this control device 14, there are further connected the motor M for moving the shutter block 4 and the movable lens barrel 8 in the direction of the optical axis L and the magnet 17 for controlling the activation of the stop lever 16 for inhibiting and permitting the rotation of the delivery cam 14. In operation, the control device 24 generates a control signal to the motor M and the magnet 17 in accordance with the states of the above-described switches S1 through S5.

Nextly, these control operations and the focal length switch-over operation and focus adjustment operation accompanying therewith will be described with reference to FIGS. 20A through 20E and flow charts in FIGS. 21 and 22.

(1) Focus Adjustment Operation in the Standard Photography Condition

Figure 20A:
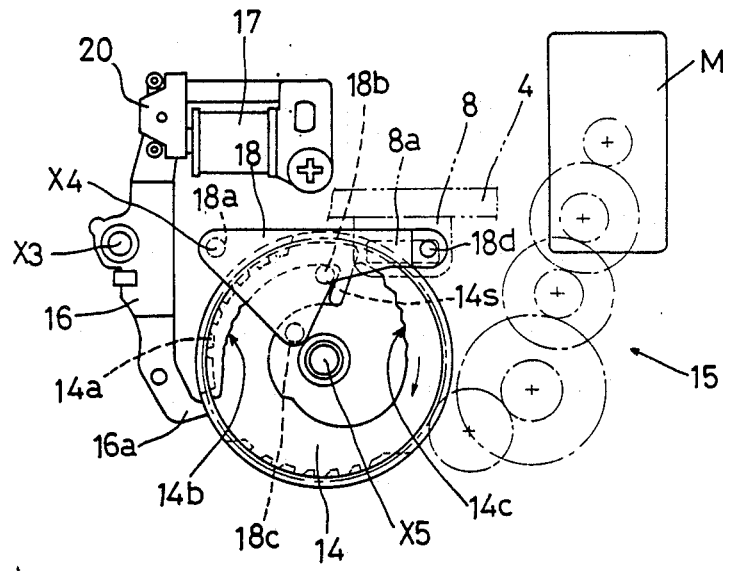
FIGS. 20A through 20E are plane views showing a drive mechanism for the photographic optical system, with FIG. 20A showing an initial condition in which the photographic optical system is focused at its infinity position in the standard photography condition, FIG. 20B showing a condition in which the photography optical system is focused at its closest focusing position in the standard photography condition, FIG. 20C showing the drive mechanism in the course of a focal length switchover operation, FIG. 20D showing an initial condition in which the photographic optical system is focused at its infinity position in the tele photography condition and FIG. 20E showing a condition in which the photography optical system is focused at its closest focusing position in the telephotography condition, respectively.

FIG. 20A shows the initial condition of the standard photography condition, i.e. the condition in which the photography optical system PS (in this case, only the main lens unit 4a) is focused at infinity. In this condition, the shutter block 4 is to stop the main lens frame 4b at a position indicated by a broken line in FIG. 1 and the main lens unit 4a, which is the fore-element of and incorporated in this shutter block 4 is at its recessed position.

Also, in this condition, the claw 16a of the stop lever 16 is in contact with the delivery cam 14 at its portion other than the ratchet portion 14a defined on the outer peripheral face of the same. And, the iron piece 20 is in contact with the magnet 17.

Further, the second pin 18b of the delivery lever 18 is in contact with the start end portion 14s of the first cam face 14b of the delivery cam 14, thereby fixedly positioning the shutter block 4 urged forwardly in the direction of the optical axis L. On the other hand, the third pin 18c of the delivery lever 18 is not in contact with the second cam face 14c of the delivery cam 14.

Figure 21:
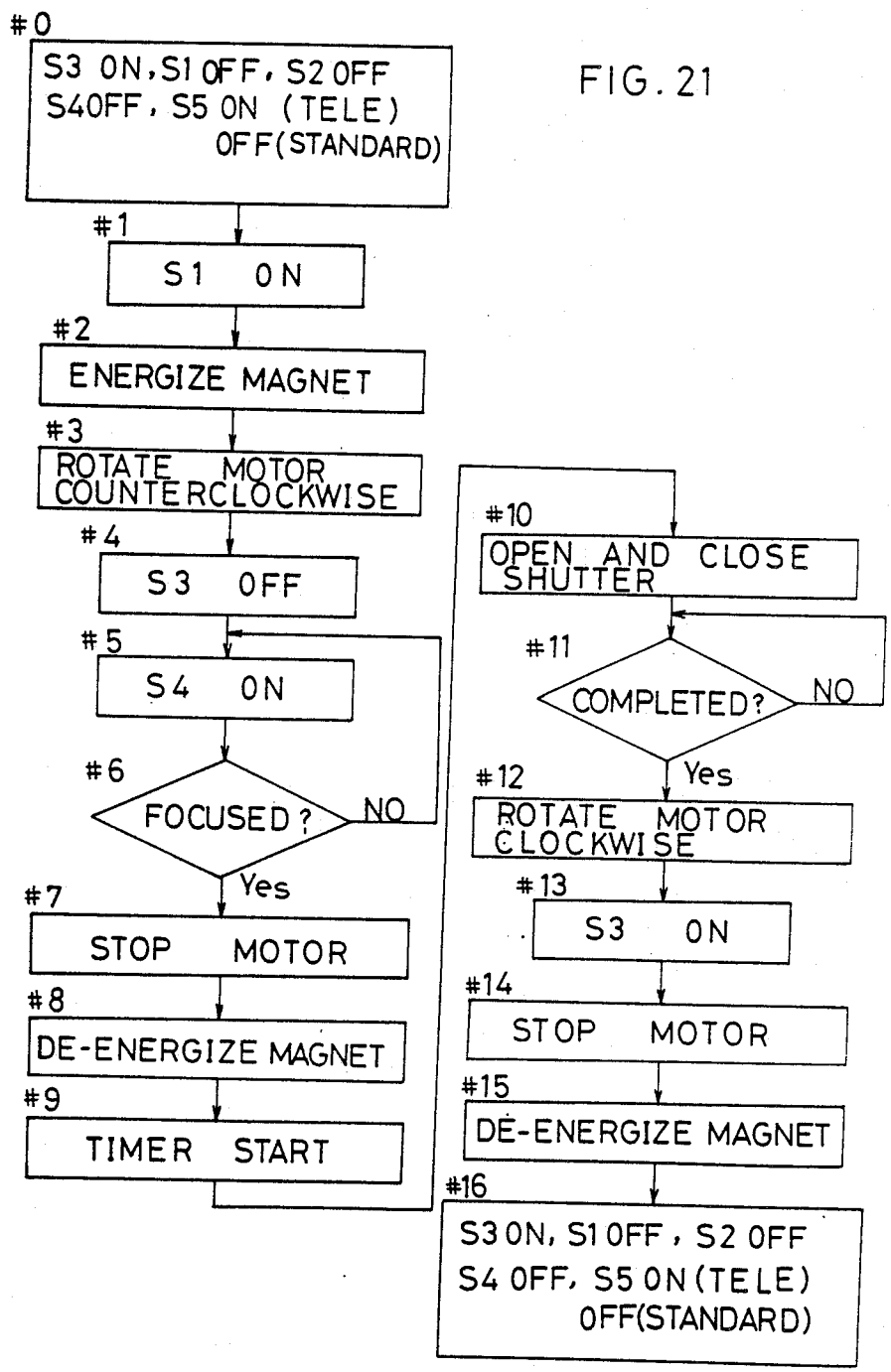
FIG. 21 is a flow chart illustrating a focus adjustment operation.
Figure 22:
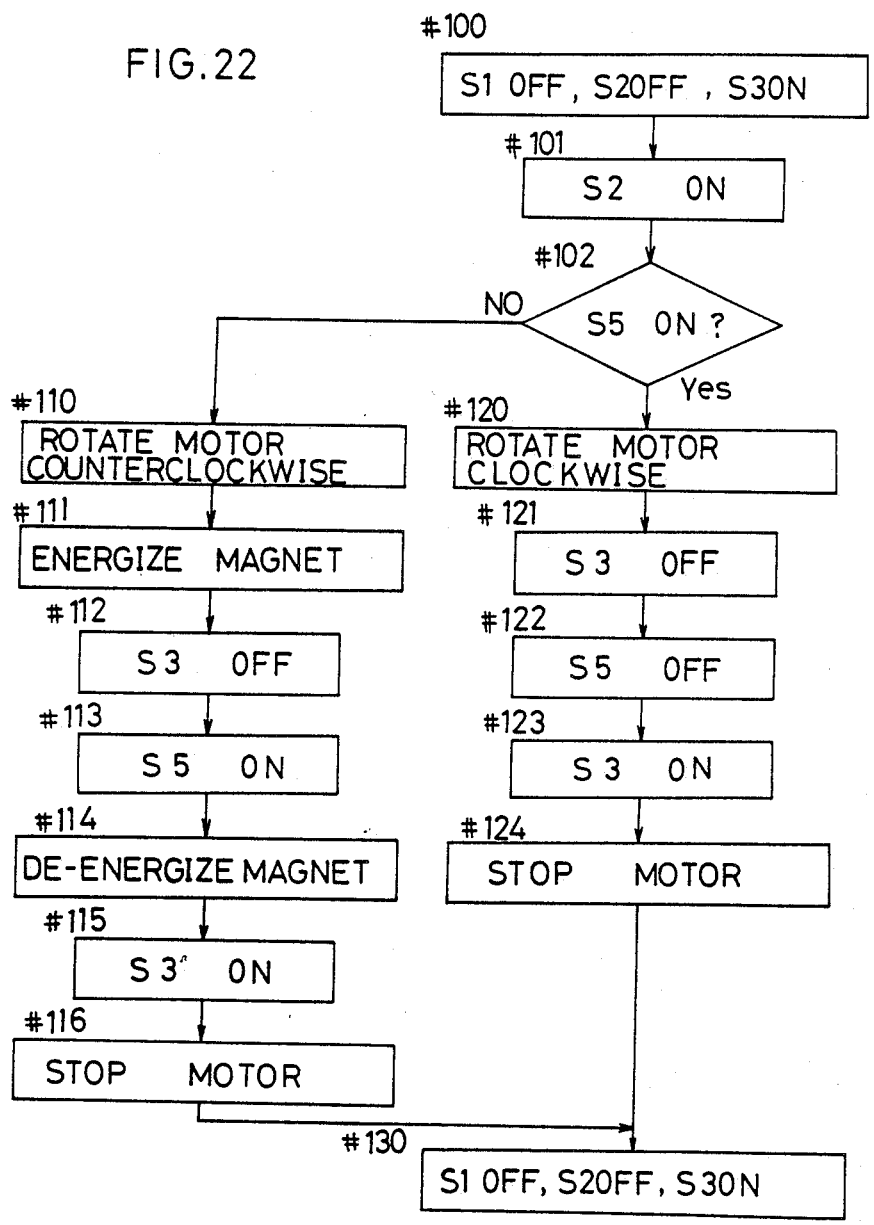
FIG. 22 is a flow chart illustrating focal length switch-over operations.

Also, only the lens initial condition detecting switch S3 is closed; whereas, the other switches S1, S2, S4 and S5 are opened (see step #0 in FIG. 21).

If the release switch S1 is closed with an operation of the release button 1 at step #1, the magnet 17 is energized to attract the iron piece 20 at step #2, and then at step #3 the motor M starts its counterclockwise rotation in FIG. 20A. Then, at step #4, through the gear train 15, the delivery cam 14 starts its clockwise rotation and the lens initial condition detecting switch S3 is opened.

With this rotation of the delivery cam 14, the second pin 18b of the delivery lever 18 moves along the first cam face 14b of the delivery cam 14 and the delivery lever 18 is rotated counterclockwise about the axis X4, whereby the shutter block 4 is moved forwardly in the direction of the optical axis L (upwardly in FIG. 20A) by the urging force of the spring 6.

Also with the rotation of the delivery cam 14, the lens position detecting switch S4 is repeatedly opened and closed at steps #5, #6, and then at step #7, the motor M is stopped when the photographic optical system PS has reached the focused position. At step #6, it is judged whether the photographic optical system PS has reached the focused position or not. This judgment is made by the control device 24 which counts the pulse signals generated by the repeated opening and closure of the lens position detecting switch S4 and then compares the counted value with a focus count value obtained independently.

After the motor M is stopped with its terminals being shorted out, the power supply to the magnet 17 is stopped at step #8. Thereby, as shown in FIG. 20B, the stop lever 16 is pivoted about the axis X3 by the urging force of the spring 19 and its claw 16a comes into engagement with the ratchet portion 14a of the delivery cam 14 to fixedly position this delivery cam 14.

At step #9, a timer (not shown) is started, and then a shutter (not shown) is opened and closed at step #10. At step #11, the process waits for a timing-up of the timer. This timer is set to time-up after a time lapse slightly longer than a maximum shutter speed. That is to say, the process waits for the completion of the shutter operation.

Figure 20B:
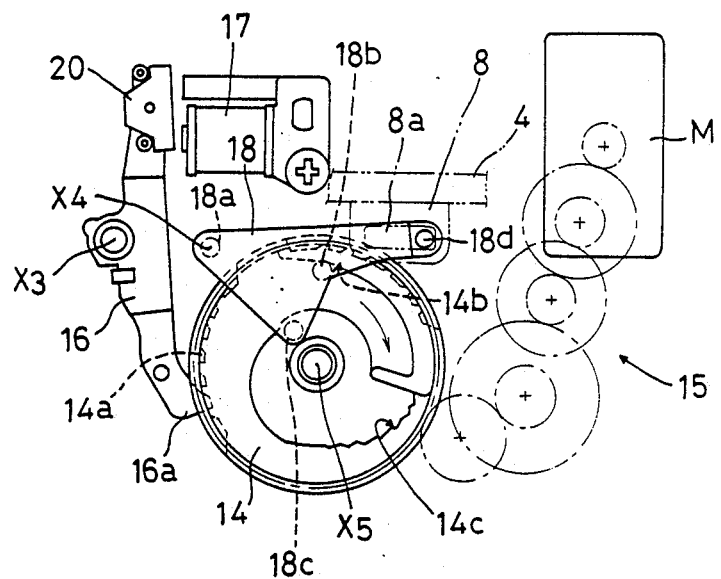

With this completion of shutter operation, the motor M starts its clockwise rotation in FIG. 20B at step #12. Then, through the gear train 15, the delivery cam 14 starts its counterclockwise rotation in the same figure. In accordance therewith, the delivery lever pivots clockwise and the shutter block 4 and the movable lens barrel 8 are moved backwardly in the direction of the optical axis L.

When the delivery cam 14 has its initial position, the lens initial condition detecting switch S3 is closed at step #13. Thereafter, the motor is stopped with its terminals being shorted out at step #14 and the power supply to the magnet 17 is stopped at step #15.

Thereby, at step #16, the process returns to the initial condition shown in FIG. 20A.

(2) Focal Length Switch-Over Operation

For switching over the photography conditions of the two focal distances, the focal distance switch-over button 2 is operated. Various switch-over operations will be respectively described next.

(i) Switch-Over From the Standard Photography Condition to the Telephotography Condition In the initial state of the standard photography condition shown in FIG. 20A (see step #100 in FIG. 22), if the lens switch-over switch S2 is closed with a depression of the focal length switch-over button 2 at step #101, the state of the lens area detecting switch S5 is checked at step #102. If the camera is in the standard photography condition, this lens area detecting switch S5 is opened. Thus, the process goes on to step #110.

At this step #110, the motor M effects its counterclockwise rotation in FIG. 20A, and then the magnet 17 is energized to attract the iron piece 20 at step #111. With this rotation of the motor M, the delivery cam 14 starts its clockwise rotation and the lens initial condition detecting switch S3 is opened at step #112.

With this clockwise rotation of the delivery cam 14, in the same manner as in the focus adjustment operation in the standard photography condition, the delivery lever 18 having its first cam face 14b in contact with the second pin 18b is rotated counterclockwise. Thereby, the shutter block 4 and the movable lens barrel 8 are moved forwardly in the direction of the optical axis L.

Figure 20C:
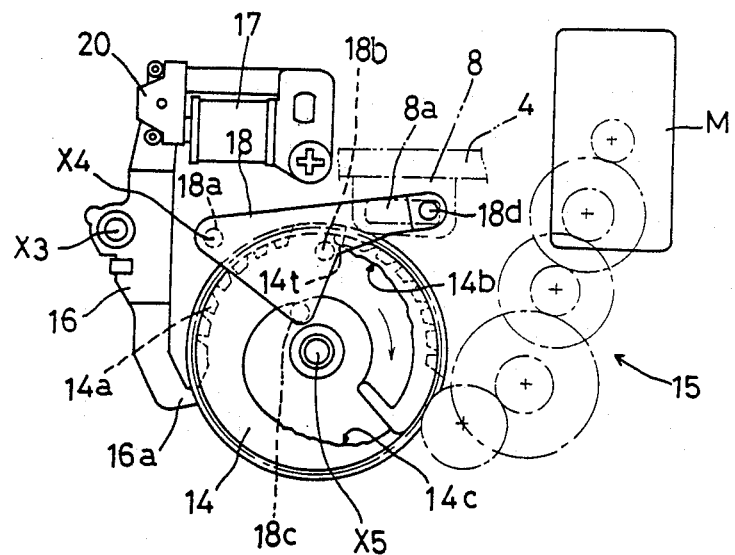

Since the first cam face 14b of the delivery cam 14 is not defined over the whole length of the same, as shown in FIG. 20C, if the delivery lever 18 is rotated and its second pin 18b passes the end portion 14t of the first cam face 14b, the first cam face 14b does not come into contact with the second pin 18b any longer. Therefore, by being pulled by the shutter block 4 urged forwardly in the direction of the optical axis L, the delivery lever 18 is permitted to be further rotated counterclockwise.

In this condition, the third pin 18c of the delivery lever 18 is in contact with the second cam face 14c of the delivery cam 14, and then, as the third pin 18c of the delivery lever 18 moves along the second cam face 14c with the clockwise rotation of the delivery cam 14, the rotation of the delivery lever 18 is controlled.

After the delivery cam 14 has been rotated to a position corresponding to the telephotography area of the photographic optical system PS and then the lens area detecting switch S5 is closed at step #113, the power supply to the magnet is stopped at step #114, thereby enabling the engagement between the claw 16a of the stop lever 16 and the ratchet portion 14a of the delivery cam 14.

Further, when the lens initial condition detecting switch S3 is closed at step #115, the motor M is stopped with its terminals being shorted out at step #116. This is the initial condition of the telephotography condition at step #130 shown in FIG. 20D. In this condition, the shutter block 4 is at a position indicated by a long and two short dashes line in FIG. 1 and the main lens frame 4b holding the main lens unit 4a, the fore-element thereof is at its projected position projected from the camera body 3.

As described hereinbefore, with this switch-over operation, the auxiliary lens unit 7 is inserted into the photographic optical path.

Figure 20D:
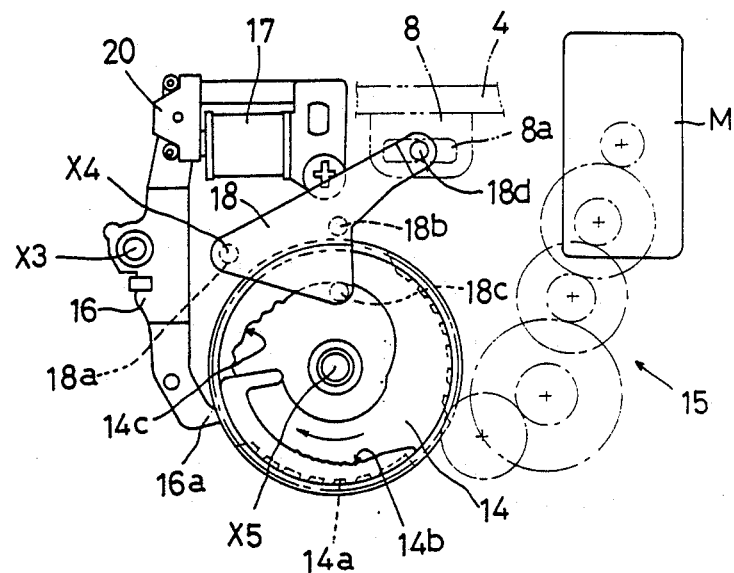

(ii) Switch-Over Operation From the Telephotography Condition to the Standard Photography Condition In the initial condition of the telephotography condition at step #100 shown in FIG. 20D, if the lens switch-over switch S2 is closed at step #101, this means that the camera is now in the telephotography condition and thus the lens area detecting switch S5 is now closed, based on the judgment at step #102, the process goes on to step #120.

At this step #120, the motor M effects its clockwise rotation in FIG. 20D. With this rotation of the motor M, the delivery cam 14 starts its counterclockwise rotation and the lens initial condition detecting switch S3 and the lens area detecting switch S5 are closed in succession at steps #121 and #122.

With this counterclockwise rotation of the delivery cam 14, the delivery lever 18 having its second cam face 14c coming into contact with the third pin 18c is rotated clockwise. Thereby, the shutter block 4 and the movable lens barrel 8 are moved backwardly in the direction of the optical axis L.

In the course of the counterclockwise rotation of the delivery cam 14, as shown in FIG. 20C, the third pin 18c of the delivery lever 18 leaves the second cam face 14c and at the same time the second pin 18b of the delivery lever 18 comes into contact with the first cam face 14b of the delivery cam 14. Thereafter, with the further counterclockwise rotation of the delivery cam 14, the second pin 18b of the delivery lever 18 moves along the first cam face 14b, whereby the pivotal movement of the delivery lever 18 is controlled.

After the delivery cam 14 has reached a position corresponding to the infinity focusing condition in the standard photography area of the photographic optical system PS and then the lens initial condition detecting switch S3 is closed at step #123, the motor M stops its rotation with its terminals being shorted out at step #124. With this, the process returns to the initial condition of the standard photography condition shown in FIG. 20a at step #130.

In the course of the above switch-over operation, the power is not supplied to the magnet 17 and the stop lever 16 is pivoted in the direction to permit its claw 16a to engage the ratchet portion 14a of the delivery cam 14. However, this not cause any inconvenience since the delivery cam 14 effects the counterclockwise rotation which direction of rotation is not inhibited by the engagement between the claw 16a and the ratchet portion 14a. In place of this construction; however, it also possible to energize the magnet 17 in the course of the switch-over operation to move the claw 16a away from the ratchet portion 14a thereby avoiding noises due to the touch of the claw 16a and the ratchet portion 14a.

As described hereinbefore, with this switch-over operation, the auxiliary lens unit 7 is receded from the photographic optical path.

In summary, the motor M, gear train 15, delivery cam 14, delivery lever 18, shutter block 4, movable lens barrel 8 secured attached to the block and so on together constitute a focal length switch-over mechanism for switching over the focal length of the photographic optical system PS.

If the focal length switchover lever 2' is provided in place of the focal length switch-over button 2, it should be arranged such that the lens switch-over switch S2 is closed each time this lever 2' is operated between the positions 'STND' and 'TELE'.

(3) Focus Adjustment Operation in the Telephotography Condition

In the initial condition of the telephotography condition shown in FIG. 20D, the photographic optical system PS (in this case, the main lens unit 4a and the auxiliary lens unit 7) is focused at infinity position.

In this condition, the claw 16a of the stop lever 16 is in contact with a portion other than the ratchet portion 14a of the outer peripheral face of the delivery cam 14 and the iron piece 20 is in contact with the magnet 17.

Further, the third pin 18c of the delivery lever 18 is in contact with the second cam face 14c of the delivery cam 14, thereby fixedly positioning the shutter block 4 urged forwardly in the direction of the optical axis L (the upper direction in the figure). Also, the second pin 18b of the delivery lever 18 is not in contact with the first cam face 14b of the delivery cam 14.

In the above condition, the lens initial condition detecting switch S3 and the lens area detecting switch S5 are closed and the other switches S1, S2, S4 are opened (see at step #0 in FIG. 21).

If the release switch S1 is closed with an operation of the shutter release button 1 at step #1, the magnet 17 is energized to attract the iron piece 20 at step #2, and then the motor M starts its rotation counterclockwise in FIG. 20D at step #3. Then, through the gear train 15, the delivery cam 14 starts its clockwise rotation and the lens initial condition detecting switch S3 is opened at step #4.

With this rotation of the delivery cam 14, the third pin 18c of the delivery lever 18 moves along the second cam face 14c of the delivery cam 14 and the delivery lever 18 is pivoted about the axis X4. Thereby, the shutter block 4 is moved forwardly in the direction of the optical axis L by the urging force of the spring 6.

Also with the rotation of the delivery cam 14, the lens position detecting switch S4 is repeatedly opened and closed at steps #5, #6, and then when the photographic optical system PS has reached in focus position, the motor is stopped with its terminals being shorted out at step #7, and thereafter the power supply to the magnet 17 is stopped at step #8.

Figure 20E:
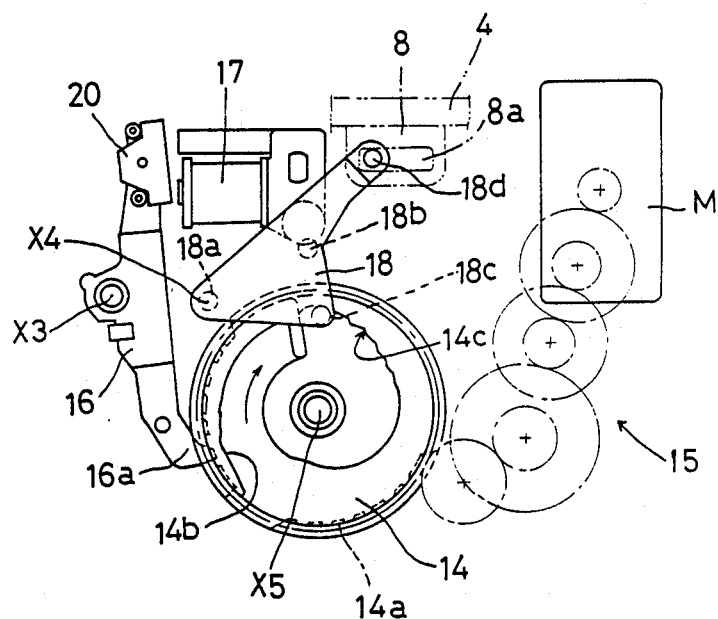

Thereby, the stop lever 16 is pivoted about the axis X3 counterclockwise, as shown in FIG. 20E, by the urging force of the spring 19 and its claw 16a comes into engagement with the ratchet portion 14a of the delivery cam 14, whereby the delivery cam 14 is fixedly positioned.

Thereafter, the timer is started at step #9 and the shutter is opened and then closed at step #10. Then, the process waits for the completion of the shutter operation. With the completion of this shutter operation, the motor M starts its rotation clockwise in FIG. 20E at step #12.

Then, through the gear train 15, the delivery cam 14 starts its counterclockwise rotation. With this rotation, the delivery lever 18 is pivoted clockwise and the shutter block 4 and the movable lens barrel 8 are moved backwardly in the direction of the optical axis L.

When the delivery cam 14 has reached its initial position, the lens initial condition detecting switch S3 is closed at step #13. Thereafter, the motor M is stopped with its terminals being shorted out at step #14 and the power supply to the magnet 17 is stopped at step #15.

With this, the process returns to the initial condition shown in FIG. 20D at step #16.

During the above-described switch-over operation between the standard photography condition and the telephotography condition in the photographic optical system PS, a switch-over operation of magnification is also carried out in a view finder optical system FS. The construction for effecting this switch-over operation will be described next.

As shown in FIG. 2B, FIGS. 23A, 23B, and 23C, this view finder optical system FS includes an objection lens 25, a variable magnification lens 26, a view frame 27, an eyepiece lens 28, a pressing plate 29, a frame plate and so on. This view finder optical system FS is accommodated in an upper half portion 5B, which is a second mount frame shaped as a cylinder having an angular or circular cross section, of the integrally formed fixing mount plate 5.

As shown in FIG. 2B, this upper half portion 5B of the fixing mount plate 5 also accommodates a near infrared light emitting element 31 constituting a light emitting section for carrying out an automatic focus adjustment in the active system and a converging lens 32 and a light receiving element 33 together acting as a light receiving section. Further, a frame member 34 including a light emitting window 34a, a light receiving window 34b and a view finder window 34c covering the fronts of the light emitting section, the light receiving section and the view finder optical system FS is securedly mounted on the fixing mount plate 5.

As shown in FIG. 2B, 24A, 24B, and 24C, in the view finder optical system FS, an objective lens holder 35 holding the objective lens 25 includes a tubular portion 35A having an angular or circular cross section and formed along the direction of the optical axis L. This tubular portion 35A outwardly engages a guide shaft 36 secured to the fixing mount plate 5, such that the objective lens 25 is movable in the direction of the optical axis L.

Also, a variable magnification lens holder 35 holding the variable magnification lens 26 is attached to be pivotable about an axis X7, such that the variable magnification lens 26 is projectable and recedable relative to an optical path of the view finder. There is also provided a spring (not shown) for urging the variable magnification lens 26 into the view finder optical path via the variable magnification lens holder 37.

Figure 23A:
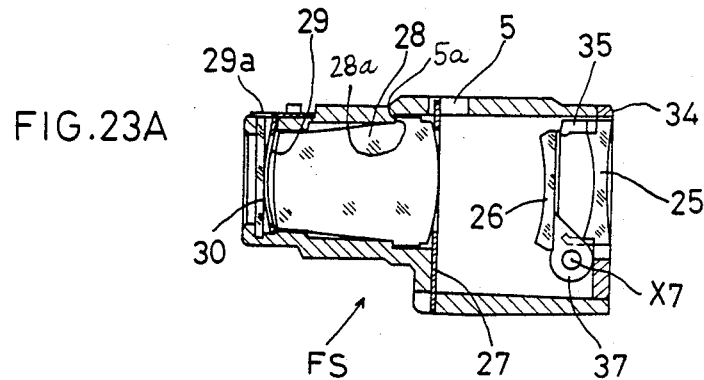
FIGS. 23A through 23C are vertical sections of the view finder optical system, with FIG. 23A showing the system in the standard photography condition, FIG. 23B showing the system in the course of a focal switch-over operation and FIG. 23C showing the system in the telephotography condition, respectively.
Figure 24A:
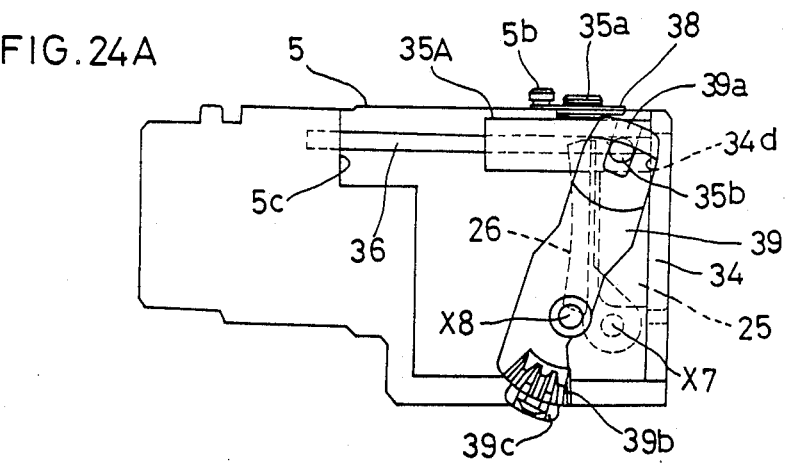
FIGS. 24A through 24C are side view of view finder magnification switch-over means, with FIG. 24A showing the means in the standard photography condition, FIG. 24B showing the same in the course of a focal length switch-over operation and FIG. 24C showing the means in the telephotography condition, respectively.

FIG. 23A and FIG. 24A show the standard photography condition. In this condition, as will be more particularly described later, the objective lens 25 is at a forwardmost position in its movable range, and the variable magnification lens 26 is inserted into the view finder optical path by the urging force of the spring.

Figure 23B:
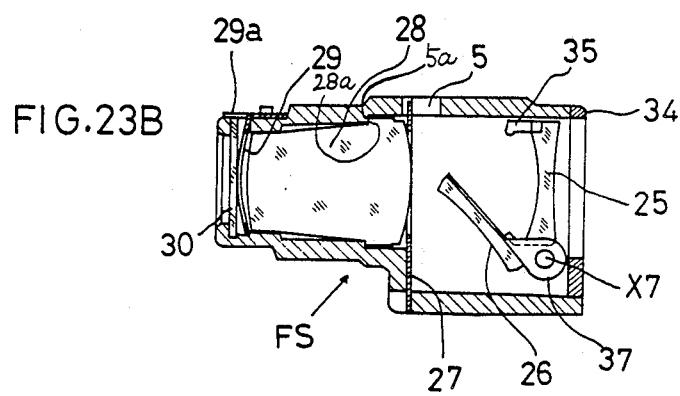
Figure 24B:
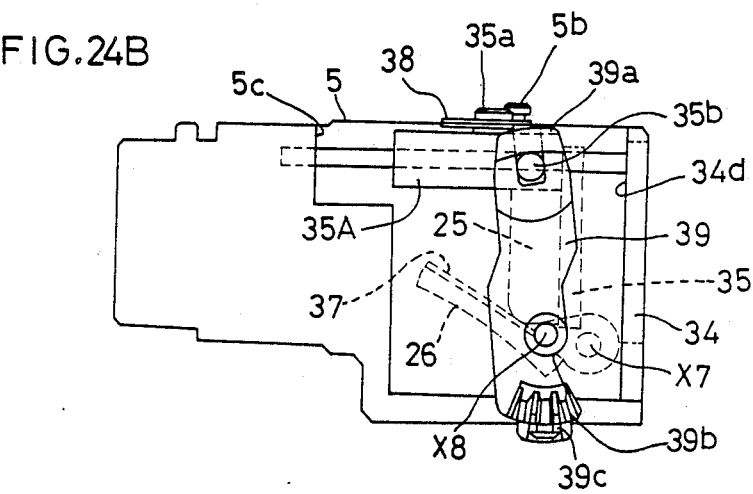

FIG. 23B and FIG. 24B show a condition in which the view finder magnification is being switched over in operative connection with the focal length switch-over operation in the photographic optical system PS. As will be more particularly described later, in operative connection with the focal length switch-over operation, the objective lens 25 is adapted to move backwardly in the direction of the optical axis L (leftwards in the same figures).

With this backward movement of the objective lens 25, a lower end edge of the objective lens holder 35 comes into contact with a forward side end face of the variable magnification lens holder 37 and depresses the same. Thereby, the variable magnification lens holder 37 is pivoted counterclockwise in the same figures against the urging force of the spring.

Figure 23C:
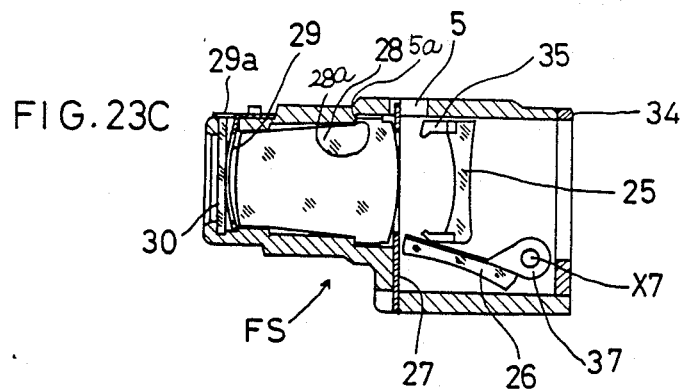
Figure 24C:
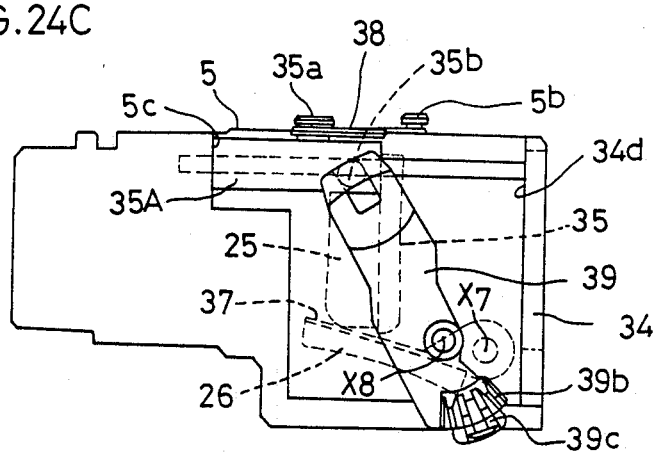

Then, as shown in FIGS. 23C and 24C, when the objective lens 25 has reached its terminal end of the movable range, the variable magnification lens 26 is completely receded from the view finder optical path. This is the telephotography condition, in which the view finder optical system FS has a magnification different from that in the standard photography condition because of the movement of the objective lens 25 and the recession of the variable magnification lens 26.

As shown in FIGS. 23A through 23C, the eyepiece lens 28 is fixedly positioned as its stepped portion 28a comes forwardly into contact with a stepped portion 5a of the fixing mount plate 5 and its forward end comes into elastic contact with th view frame 27.

Also, the frame plate 30 forms a semi-transparent plated frame for showing a frame indicating a photographable range within the finder view. This frame plate 30 is fixedly positioned as the pressing plate 29 comes forwardly into elastic contact with the plate and is prevented from being inadvertently detached as a bent portion 29a of the pressing plate 29 comes into contact with the same from above.

As shown in FIGS. 24A through 24C, at an upper portion and a side portion of the tubular portion 35A of the objective lens holder 35, there are respectively implated an upper pin 35a and a side pin 35b.

Between the upper pin 35a and a pin 5b implated on the upper face of the fixing mount plate 5, there is provided a spring 38. The pin 5b of the fixing mount plate 5, in a side view, is positioned substantially in the middle of the movable range of the upper pin 35a of the objective lens holder 35.

The spring 38 urges the objective lens holder 35 forwardly when the upper pin 35a of the objective lens holder 35 is positioned more forwardly than the pin 5b of the fixing mount plate 5 and urges the objective lens holder 35 backwardly when the the upper pin 35a is positioned rearwardly of the pin 5b.

On the other hand, the side pin 35b of the objective lens holder 35 engages forked portion 39a of the upper end of a switch-over lever 39. This switch-over lever 39 is pivotable about an axis X8, and with the pivotable motion of the same, the objective lens holder 35 is moved forwardly or backwardly.

As described hereinbefore, the objective lens holder 35 is urged by the urging force of the spring 38 forwardly (the standard photography condition side) or backwardly (the telephotography condition side) depending on relative positions of its upper pin 35a and pin 5b of the fixing mount plate 5. The objective lens holder 35 is fixedly positioned as the forward end or rearward end of its cylindrical portion 35A comes into contact with a back face 34d of the frame member 34 or a contact portion 5c of the fixing mount plate 5.

The switch-over lever 39 includes a bevel gear portion 39b at a portion thereof opposed to the forked portion 39a across the pivotal axis X8. To this bevel gear portion 39b, as shown in FIG. 2B and also in FIGS. 25A and 25B, there is opposed a bevel gear 40 including two gear teeth defined only at a peripheral portion thereof.

Figure 25A:
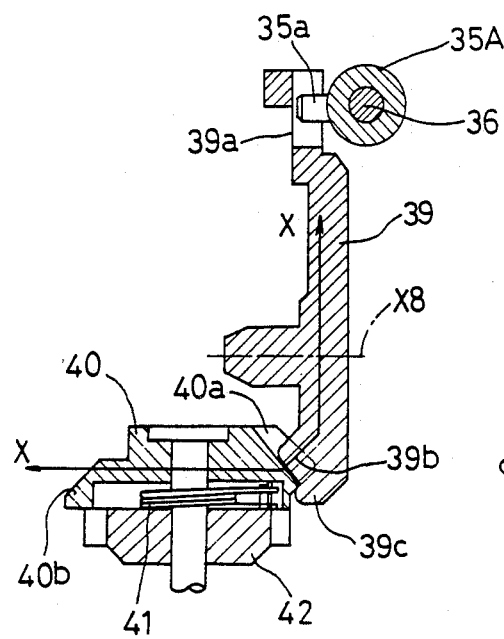
FIGS. 25A and 25B are sectional views illustrating relationship between a switch-over control lever and a bevel gear, with FIG. 25A showing the same in the course of a focal length switch-over operation, FIG. 25B showing the same in the course of a focus adjustment operation.
Figure 25B:
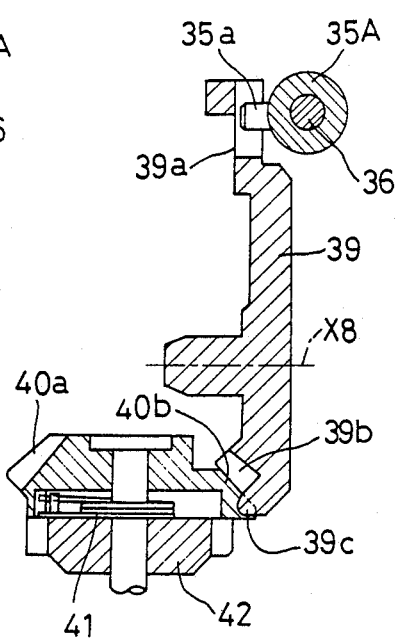
Figure 26:
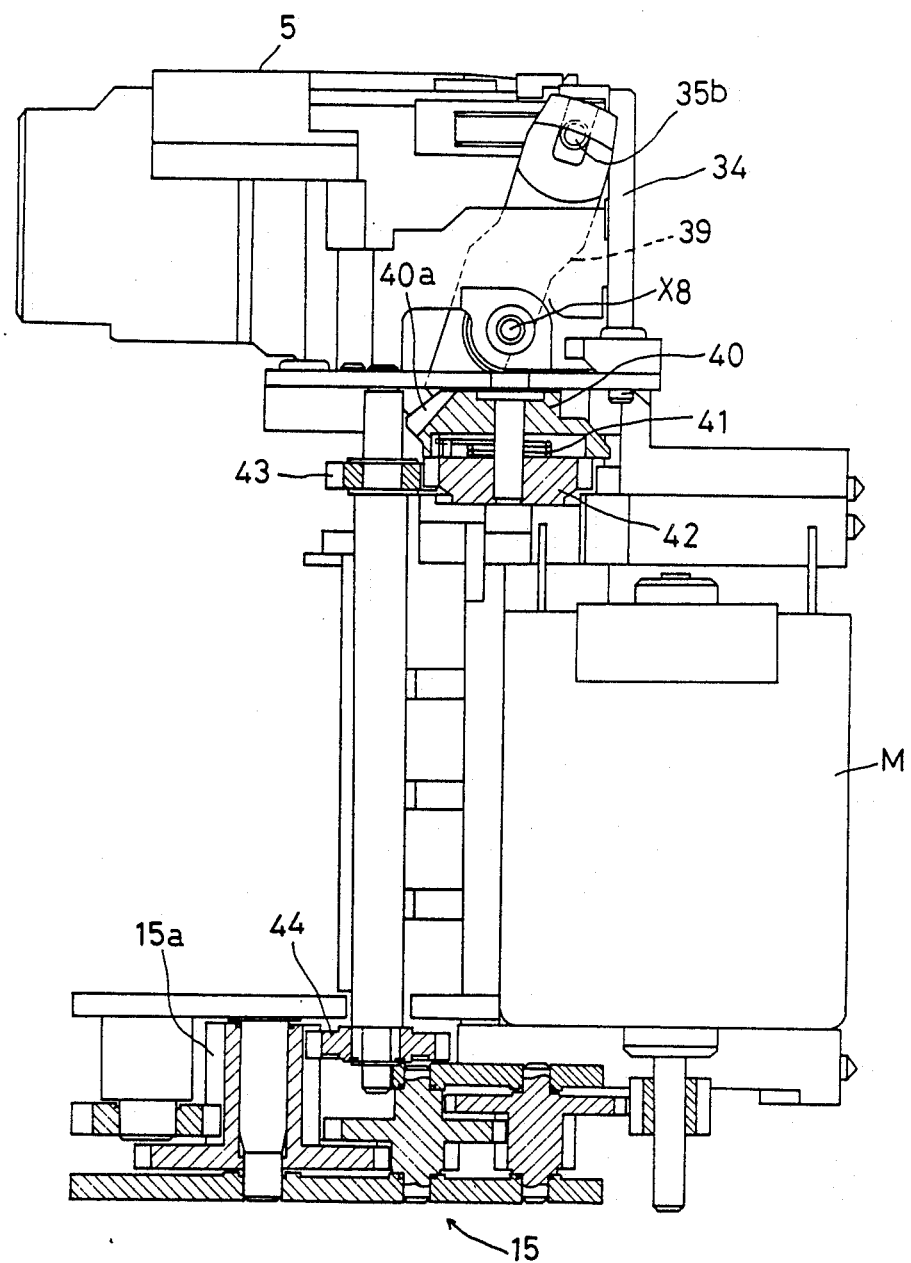
FIG. 26 is a schematic section of coupling means.

This bevel gear 40, as shown in FIG. 2B, FIGS. 25A and 25B and also in FIG. 26, is operatively connected via a spring 41 with a gear 42. Further, a gear 44 rotatable in unison with a gear 43 meshing the gear 42 meshes the gear 15a of the gear train 15 for transmitting the drive of the motor M to the delivery cam 14 in the photographic optical system PS.

That is to say, with a normal or reverse rotation of the motor M, this bevel gear 40 is rotated. A gear portion 40a of this bevel gear 40 is adapted to mesh the bevel gear portion 39b of the switch-over lever 39 only in the course of the focal length switch-over operation in the photographic optical system PS. With this meshing between the gear portion 40a and the bevel gear portion 39b, the switch-over lever 39 is pivoted about the axis X8, whereby the magnification of the view finder optical system FS is switched over as described before.

FIGS. 28A through 28C show a two-dimensional relationship between the positions of the switch-over lever 39 and the bevel gear 40, which are developments along a line X—X in the front section view of FIG. 25A.

((1)) Standard Photography Condition

FIG. 28A shows the standard photography condition, which initial condition is provided when the gear portion 40a of the bevel gear 40 is at a position indicated by a reference mark "a" in the same figure. In this condition, the photographic optical system PS is focused at its infinity position. If the motor M is driven from this initial condition, the bevel gear 40 is rotated clockwise to return to a position denoted by a reference mark "b" in the same figure.

In the course of the above movements, the focus adjustment operation in the standard photography condition is carried out. That is, at the position "b", the photographic optical system PS is focused at its closest focusing position.

Also, in the course of the above movements, the gear portion 40a of the bevel gear 40 is not in mesh with the bevel gear portion 39b of the switch-over lever 3. Therefore, the magnification is not changed over in the view finder optical system FS and the system FS has a magnification suitable for the standard photography condition. In this condition, as shown in FIG. 27A, the switch-over lever 39 is forwardly inclined.

((2)) Focal Length Switch-Over Operation

For effecting a focal length switch-over from the standard photography condition to the telephotography condition, the bevel gear 40 is further rotated clockwise beyond the position "b" in FIG. 28A and its gear portion 40a reaches a position denoted by a reference mark "c" to nearly mesh with the bevel gear portion 39b of the switch-over lever 3. In the above movements, the magnification in the view finder optical system FS remains un-switched over, thus, the finder optical system FS still has the magnification suitable for the standard photography condition.

While moving from the position "c" to a position "d", the gear portion 40a of the bevel gear 40 comes into mesh with the bevel gear portion 39b of the switch-over lever 39 thereby pivoting this lever 39 counterclockwise in FIG. 27C. As shown in FIG. 28B, when the gear portion 40a of the bevel gear 40 has reached the position "d" and comes out of the mesh with the bevel gear portion 39b, the switch-over lever 39 is backwardly inclined as indicated by a solid line in FIG. 27B.

In this condition, the upper pin 35a of the objective lens holder 35 bound by the forked portion 39a of the switch-over lever 39 is positioned rearwardly than the pin 5b of the fixing mount plate 5. Thereafter, as described hereinbefore, by the urging force of the spring 38, the objective lens holder 35 is urged rearwardly and in accordance therewith the switch-over lever 39 is further backwardly inclined as shown in FIG. 27C.

With this backward movement of the objective lens holder 35, the objective lens 25 is moved to its rear end of its movable range and at the same time the variable magnification lens 26 is receded from the view finder optical path, whereby the magnification of the view finder optical system FS is switched over to be suitable for the telephotography condition. Also, in this condition, the bevel gear portion 39b of the switch-over lever 39 has been moved to a position shown in FIG. 28C.

After coming out of the meshing with the bevel gear portion 39b of the switch-over lever 39, with the further rotation of the bevel gear 40, the gear portion 40a of the bevel gear 40 reaches a position denoted by a reference mark "e" shown in FIGS. 28B and 28C and the rotation of the bevel gear 40 is stopped at this position. In the course of the above operations, the gear portion 40a of the bevel gear 40 does not again come into mesh with the bevel gear portion 39b of the switch-over lever 39. Therefore, the magnification of the view finder optical system FS is not changed over and the system FS still has the same magnification suitable for the telephotography condition.

On the other hand, in the photographic optical system PS, while the gear portion 40a of the bevel gear 40 moves from the position "b" shown in FIG. 28A to the position "e" shown in FIG. 28C, the focal length is switched over. And, when the gear portion 40a of the bevel gear 40 is at the position "e", there is provided the initial condition of the standard photography condition. In this condition, the photographic optical system PS is focused at infinity position.

For switching over the focal length from the telephotography condition to the standard photography condition, the bevel gear 40 is rotated counterclockwise from the position "e" in FIG. 28C and its gear portion 40a returns to a position "d'" to mesh with the bevel gear portion 39b of the switch-over lever 39.

Then, while the gear portion 40a of the bevel gear 40 moves from the position "d'" in FIG. 28C to a position "c'" in FIG. 28B, the switch-over lever 39 is pivoted clockwise in FIG. 27B. As the bevel gear 40 is further rotated and its gear portion 40a comes out of the meshing with the bevel gear portion 39a of the switch-over lever 39, the switch-over lever 39 is forwardly inclined as indicated by a long and two short dashes line in FIG. 27B. Thereafter, the switch-over lever 39 is further pivoted as the objective lens holder 35 is move forwardly by the urging force of the spring 38 and returns to is forwardly inclined position in the initial condition shown in FIG. 27A.

With this forward movement of the objective lens holder 35, the objective lens 25 is moved to its forward end in its movable range and at the same time the variable magnification lens 26 is inserted into the view finder optical path, whereby the magnification of the view finder optical system FS returns to the magnification suitable for the standard photography condition. Also, the bevel gear 40 is further rotated and this rotation is stopped when its gear portion 40a has reached the position "a" shown in FIG. 28A.

(3) Telephotography Condition

From the initial condition of the telephotography condition in which the gear portion 40a of the bevel gear 40 is at the position "e" in FIG. 28C, with a drive of the motor M, the bevel gear 40 is rotated clockwise to reach a position denoted by a reference mark "f". In the course of the above operation, the focus adjustment operation in the telephotographic condition is carried out. That is to say, at this position "f", the photographic optical system PS focused at its closest focusing position.

Also, in the course of the above operation, the gear portion 40a of the bevel gear 40 is not in mesh with the bevel gear portion 39b of the switch-over lever 39. Therefore, the magnification is not switched over in the view finder optical system FS and the system FS maintains the magnification suitable for the telephotography condition.

That is to say, as described above, the forwardly and backwardly movable objective lens holder 35, the variable magnification lens hoder 37 projectable and recedable relative to the view finder optical path through its oscillation, switch-over lever 39, the spring 38 and so on together constitute view finder magnification switch-over means for switching over the magnification of the view finder optical system FS.

And, as also described above, the gear portion 40a of the bevel gear 40 meshes the bevel gear portion 39b of the switch-over lever 39 only when the focal length is switched over in the photographic optical system PS thereby pivoting this lever 39 about the axis X8 and the magnification of the view finder optical system FS is switched over.

That is to say, the bevel gear 40 defining the gear portion 40a only at a portion thereof in the periphery direction, the spring 41, the tree gears 42 through 44 together constitute coupling means for coupling the gear 15a acting as the movable member of the control means to the switch-over lever 39 acting as a movable member of the view finder magnification switch-over means only in the focal length switch-over operation in the photographic optical system PS.

Since the operative connection between the view finder magnification switch-over means and the motor M in the view finder optical system FS is broken during the focus adjustment operation in the photographic optical system PS in the standard photography condition and in the telephotography condition, with the single motor M, the focus adjustment operation and the focal length switch-over operation in the photographic optical system PS and the magnification switch-over operation in the view finder optical system FS may be carried out and at the same time the load to the motor M may be reduced because its driving force is efficiently utilized.

Figure 29A:
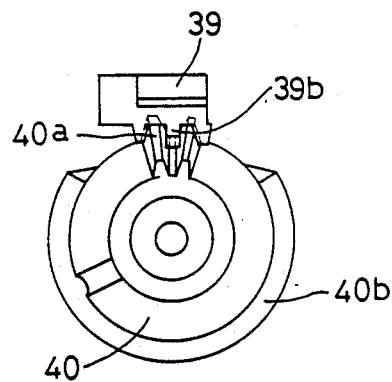
FIGS. 29A and 29B are plane views showing relationship between a projection of the switch-over control lever and a bulging portion of the bevel gear, with FIG. 29A showing the same in the course of a focal length switch-over operation and FIG. 29B showing the same in the course of a focus adjustment operation, respectively.
Figure 29B:
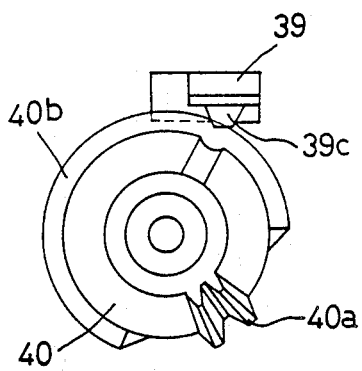

On the other hand, as shown in FIGS. 25A, 25B and also in FIGS. 29A and 29B, of the outer peripheral face of the bevel gear 40, except for the gear portion 40a, there is formed a bulging portion 40b. Also, at the lower end of the switch-over lever 39, there is formed the projection 39c.

The bulging portion 40b of the bevel gear 40, as shown in FIG. 25A and in FIG. 29A, is not in contact with the projection 39c of the switch-over lever 39 when the gear portion 40a of the bevel gear 40 is in mesh with the bevel gear portion 39b of the switch-over lever 39, thereby not interfering with the pivotal movement of the switch-over lever 39 about the axis S8.

Also, as shown in FIGS. 25B and 29B, when the gear portion 40a of the bevel gear 40 is not in mesh with the bevel gear portion 39b of the switch-over lever 39 and the magnification of the view finder optical system FS is set to be suitable for either of the standard photography condition or the telephotography condition, the bulging portion 40b of the bevel gear 40 is positioned opposed to the projection 39c of the switch-over lever 39.

Also, the bulging portion 40b of the bevel gear 40 is slightly apart from the projection 39c of the switch-over lever 39. In this condition, if any external force is applied to the view finder optical system FS for pivoting the switch-over lever 39 about the axis X8, the switch-over lever 39 is slightly pivoted and its projection 39c comes into contact with the bulging portion 40b of the bevel gear 40 and then the pivotal movement of the switch-over lever 39 about the axis X8 is prevented. Thereby, the movement of the objective lens holder 35 beyond the pin 5b of the fixing mount plate 5 is prevented and the switch-over lever 39 returns to its proper position by the urging force of the spring 38.

That is to say, even if any external force such as a vibration is applied, the inadvertent switch-over of the magnification of the view finder optical system may be advantageously prevented.

In the previous embodiment, the cam face forming peripheral face of the delivery cam 14 is divided into the former half portion, the first cam face 14b and the latter half portion, the second cam face 14c. For embodying the present invention, this cam face forming peripheral face may not be divided as well.

Figure 31:
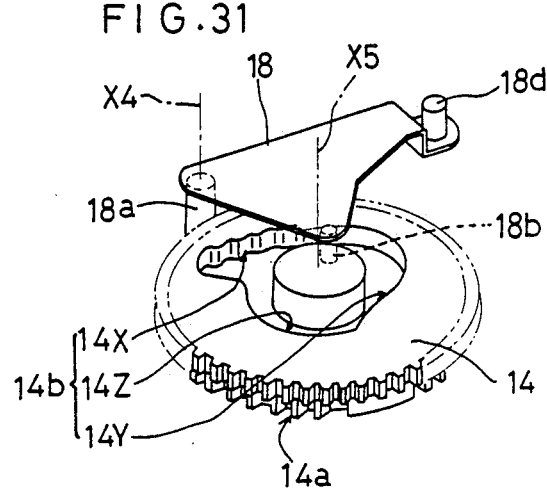
FIG. 31 is a perspective view showing a delivery cam and a delivery lever according to another embodiment of the present invention corresponding to FIG. 11.

FIG. 31 shows an example of such construction. In this construction, since the cam face 14b is not divided, there is provided only the pin 18b implanted on the lower face of the delivery lever 18. The rest of the construction are the same as the previous embodiment. Therefore, the construction is illustrated with the same reference marks and will not be particularly described.

Also, in case the focal length of the photographic optical system PS may be switched over in two steps as described in the previous embodiment, the peripheral face of the delivery cam 14 may be divided into more than three portions. Further, it is also possible to arrange such that the focal length of the photographic optical system PS may be switched over in more than three steps. In this case, the peripheral face of the delivery cam 14 may be divided into three or two or four portions or may be divided at all as well.

Also, in place of the rotary type delivery cam 14 used in the previous embodiment, a translation type may be employed.

Further, in the previous embodiment, the shutter block 4 and the movable lens barrel accommodating the photographic optical system PS are urged forwardly by means of the spring 6 and the fourth pin 18d of the delivery lever 18 shifted in operative connection with the rotation of the delivery cam 14 is engaged into the elongate slot 8a of the movable lens barrel 8 thereby determining the position of the photographic optical system PS. In place of this construction, as shown in FIG. 32, it is also possible to arrange such that the cam follower 18 may move along a cam groove 14b having as its side wall the cam face 14b of the delivery cam 14 coupled with the motor M.

Figure 32:
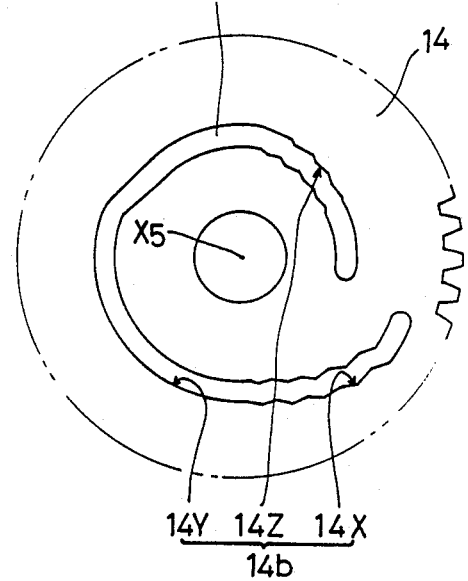
FIG. 32 is a plane view showing a delivery cam according to still another embodiment corresponding to FIG. 13, and FIGS. 33 and 34 are schematic views showing alternate embodiments of the focal length switch-over mechanism respectively.

In this FIG. 32, it is to be noted, the peripheral face of the delivery cam 14 is not divided. However, the same construction may be employed even if the peripheral face is divided.

In the case of the sensor used in the previous embodiment, the metal contacts attached respectively on the bottom face of the delivery cam 14 and on the upper face of the cam mount plate 13 come into contact with each other. In place of this, an optical type sensor may be employed, in which a light source and a light receiving element are provided on the upper face of the cam mount plate 13 and on the lower face of the lower half portion 5A of the fixing mount plate 5 and the delivery cam 14 peripherally defines a plurality of holes whereby a position of the cam is detected by using pulse signals generated from the light receiving element with the rotation of the delivery cam 14.

In place of the cam mount plate 13 acting as a fixing member in the previous embodiment, a shaft or the like for supporting the delivery cam 14 may be employed as well.

Figure 33:
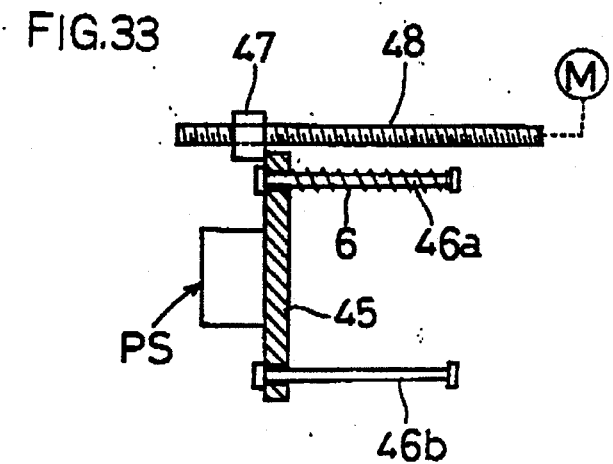
Figure 34:
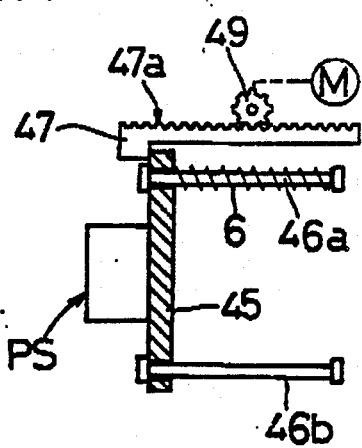

As described at page 16 of the present specification, FIGS. 33 and 34 show alternative embodiments of the mechanism according to the present invention.

In the previous embodiment, the control mechanism slides the main lens unit 4a, which is the fore-element of the photographic optical system PS, towards its recessed portion against the urging force of the spring 6. A delivery cam 14, which is operatively connected to the motor M, comprises an operating member while the delivery lever 18, which is operatively connected to the shutter block 4 holding the main lens unit 4a, comprises the operated member. There is provided between the delivery cam 14 and the delivery lever 18 a space to permit the movement of the operated member towards its recessed portion. In place of this, the specific construction of the control mechanism may be conveniently varied therefrom as will be illustrated by way of a few examples to be described next.

In a construction shown in FIG. 33, a base plate 45, which holds the fore-element (not shown in FIG. 33) of the photographic optical system PS, is slidable in the forward and rearward directions along a pair of guide rods 46a and 46b. The base plate 45 is urged towards the forward direction by the spring 6. A regulating member 47, which forwardly contacts the base plate 45, regulates the movement of the base plate 45 against the urging force of the spring 6 and its position is adjusted with a male screw element 48.

In this embodiment, the regulating member 47 acts as an operating member while the base plate 45 acts as an operated member. The arrangement for permitting the movement of the operating member (i.e. base plate 45) towards its recessed position is provided by the regulating member 47. The regulating member 47 forwardly comes into a one-sided contact with the base plate 45 to permit a rearward movement of the base plate 45.

FIG. 34 shows still another construction modified from that of FIG. 33. In this construction, the regulating member 47 and the motor M are operatively connected with each other not through a screw member, but through a rack 47a formed on the regulating member 47 and a pinion 49 connected with the motor M. The rest of the construction is the similar in construction as the embodiment of FIG. 33 and therefore like parts, which are denoted by like reference marks, are not further described with regard to their details.

We claim:

1. A camera having a photographic optical system capable of switching over a focal length comprising:
   control means;
   cam means operatively connected with said control means;
   a first cam face defined on said cam means for effecting a first focus adjustment in a first focal length from a shortest photographic length to a longest photographic length;
   a second cam face defined on said cam means and aligned with said first cam face in an operative direction of said cam means for switching over from the first focal length to a second focal length;
   a third cam face defined on said cam means and aligned with said second cam face in a peripheral direction of said cam means for effecting a focus adjustment in the second focal length from a second shortest photographic length to a second longest photographic length; and camera follower means driven by said first through third cam faces and connected with said photographic optical system to drive the same.

2. A camera, having a photographic optical system capable of switching over a focal length comprising:
   control means;
   cam means operatively connected with said control means;
   a first cam face defined on said cam means for effecting a focus adjustment in a first focal length;
   a second cam face defined on said cam means and aligned with said first cam face in an operative direction of said cam means for switching over from the first focal length to a second focal length;
   a third cam face defined on said cam means and aligned with said second cam face in direction of said cam means for effecting a focus adjustment in the second focal length;
   camera follower means driven by said first through third cam faces and connected with said photographic optical system to drive the same,
   wherein said cam means is rotatable about an axis of said photographic optical system and said cam faces are aligned peripherally of said cam means.

3. A camera, as defined in claim 2, wherein said cam faces are divided into at least two portions in the peripheral direction and said cam follower means includes cam follower members corresponding respectively to said portions.

4. A camera having a photographic optical system capable of switching over a focal length comprising:
   cam means operatively connected with said control means to be rotated by the same;
   a first cam face defined on said cam means for effecting a focus adjustment in a first focal length;
   control means,
   a second cam face defined on said cam means and aligned with said first cam face in a peripheral direction of said cam means for switching over from the first focal length to a second focal length;
   a third cam face defined on said cam means and aligned with said second cam face in the peripheral direction of said cam means for effecting a focus adjustment in the second focal length; and
   cam follower means driven by said first through third cam faces and connected with said photographic optical system to drive the same;
   wherein said cam faces are divided into at least two portions in the peripheral direction and said cam follower means includes cam follower members corresponding respectively to said portions such that when one of the cam follower members engaged with the corresponding cam face, another of the cam follower members disengages from the corresponding cam face.

5. A camera, as defined in claim 4, wherein said second cam face is divided substantially in the middle portion thereof into a first portion aligned with said first cam face and a second portion aligned with said their cam face.

6. A camera, as defined in claim 4, wherein said cam faces are displaced relative to each other in the direction of a rotational axis of said cam means a cross the divided portions thereof.

7. A camera having a photographic optical system capable of switching over a focal length comprising:
   control means;
   cam means operatively connected with said control means;
   a first cam face defined on said cam face for effecting a first focus adjustment in a first focal length from a shortest photographic length to a longest photographic length;
   a second cam face defined on said cam means for switching over from the first focal length to a second focal length;
   a third cam face defined on said cam means for effecting a focus adjustment in the second focal length from a second shortest photographic length to a second longest photographic length.
   cam follower means driven by said first through third cam faces and connected with said photographic optical system to drive the same; and a sensor disposed between same cam means and a fixing portion of the camera for detecting a position of said cam means relative to the operative direction of the same.

8. A camera, as defined in claim 7, wherein said cam means is rotatable and said fixing portion is a mount plate rotatably supporting said cam means.

9. A camera, as defined in claim 8, wherein said sensor includes a contact pattern formed to correspond to the position of said cam means relative to the rotational direction of the same and a contact element coming into sliding contact with said contact pattern.

10. A camera, as defined in claim 9, wherein said contact pattern is fixedly attached to said fixing portion and said contact element is fixedly attached to said cam means.

11. A camera capable of switching over a focal length as at least a front portion of a photographic optical system shifts along a direction of an optical axis thereof between a position projected from the body camera and a portion receded with the camera body, comprising:
 an urging member for urging said front portion towards the position projected from the camera body; and
 a control mechanism capable of shifting said front portion towards the camera body in a receding direction against an urging fore of said urging member while allowing a receding movement of the front portion away from said control mechanism.

12. A camera, as defined in claim 11, wherein said control mechanism includes cam means and cam follower means.

13. A camera capable of switching over a focal length as at least a front portion of a photographic optical system shifts along a direction of an optical axis thereof between a position projected from a camera body and a position receded within the camera body, comprising:
 an urging member for urging said front portion towards the position projected from the camera body; and
 a control mechanism capable of shifting said front portion towards the camera body in a receding direction against an urging force of said urging member, wherein said control mechanism further includes a screw provided substantially in parallel with the optical axis of said photographic optical system and a driven member coming into engagement with said screw to be driven in the direction of the optical axis with a rotation of said screw.

14. A camera capable of switching over a focal length as at least a front portion of a photographic optical system shifts along a direction of an optical axis thereof between a position projected from a camera body and a position receded within the camera body, comprising:
 an urging member for urging said front portion towards the position projected from the camera body; and
 a control mechanism capable of shifting said front portion towards the camera body in a receding direction against an urging force of said urging member, wherein said control mechanism is driven by electric drive means.

15. A camera, as defined in claim 14, wherein said electric drive means includes an electric motor and a speed reduction mechanism for transmitting a power of said motor in a reduced rotation.

16. A camera, as defined in claim 11, wherein said control mechanism is capable of shifting said front portion by an operational amount at least necessary for switch-over of the focal length and focus adjustment.

17. A camera capable of focusing and switching over a focal length as at least a front portion of a photographic optical system shifts along a direction of an optical axis thereof within a shift range between a position projected from a camera body and a position receding within the camera body, comprising:
 an urging member for urging said front portion towards the position projected from the camera body; and
 a control mechanism capable of shifting said front portion towards the camera body in a receding direction against an urging force of said urging member for focusing and for switching over a focal length.

* * * * *